United States Patent
Wagner et al.

(10) Patent No.: US 8,341,057 B1
(45) Date of Patent: Dec. 25, 2012

(54) SYSTEM AND METHOD OF ANALYZING AND MONITORING A CUSTOMER'S FINANCIAL CONDITION

(75) Inventors: Dennis Wagner, Allen, TX (US); Wyatt Mordecai, Allen, TX (US); Shelly Marie Bergman, Dallas, TX (US); John Jay Toth, Plano, TX (US)

(73) Assignee: Capital One Financial Corporation, McLean, VA (US)

( * ) Notice: Subject to any disclaimer, the term of this patent is extended or adjusted under 35 U.S.C. 154(b) by 814 days.

(21) Appl. No.: 11/767,111

(22) Filed: Jun. 22, 2007

(51) Int. Cl.
*G06Q 40/00* (2012.01)
(52) U.S. Cl. .................................... 705/36 R
(58) Field of Classification Search .................. 705/36 R
See application file for complete search history.

(56) References Cited

U.S. PATENT DOCUMENTS

| | | | |
|---|---|---|---|
| 6,877,034 B1* | 4/2005 | Machin et al. ............... | 709/223 |
| 7,711,595 B2* | 5/2010 | Dickerson, Jr. ................ | 705/10 |
| 7,725,377 B2* | 5/2010 | Jain ................................ | 705/35 |
| 7,765,138 B2* | 7/2010 | Loeper ........................ | 705/36 R |
| 2003/0078881 A1 | 4/2003 | Elliot et al. | |
| 2004/0073477 A1 | 4/2004 | Heyns et al. | |
| 2004/0153389 A1 | 8/2004 | Lortscher, Jr. | |
| 2005/0010510 A1* | 1/2005 | Brose et al. ..................... | 705/35 |
| 2005/0060253 A1* | 3/2005 | Paulsen-Dziuk et al. ....... | 705/35 |
| 2005/0137953 A1 | 6/2005 | McDonough et al. | |
| 2006/0218087 A1 | 9/2006 | Zimmerman | |
| 2007/0050276 A1* | 3/2007 | Mannion ......................... | 705/35 |

* cited by examiner

*Primary Examiner* — Jessica Lemieux
(74) *Attorney, Agent, or Firm* — Hunton & Williams LLP

(57) ABSTRACT

Systems and methods for a financial health meter system are provided. Additionally, computer-implemented methods for analyzing and monitoring a customer's financial condition are provided. These methods may include storing a financial profile associated with a customer, determining a peer group of financial profiles for the customer, comparing the financial profile associated with the customer to the peer group of financial profiles, developing one or more financial plans based the financial profile and comparison information, implementing a financial plan, and monitoring the financial plan. The financial profile includes at least financial information about the customer and financial goals of the customer.

20 Claims, 19 Drawing Sheets

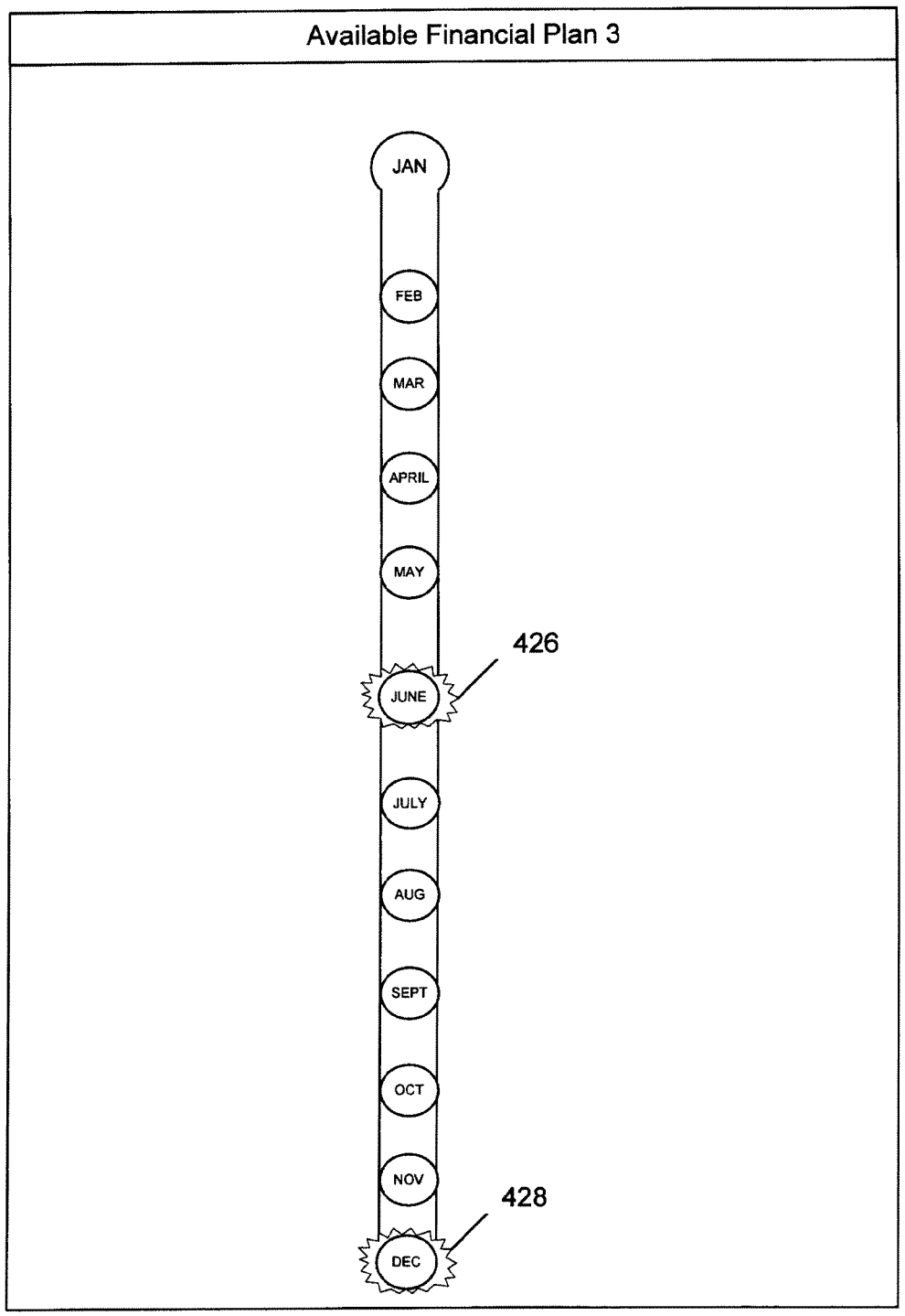
FIG. 4c    424

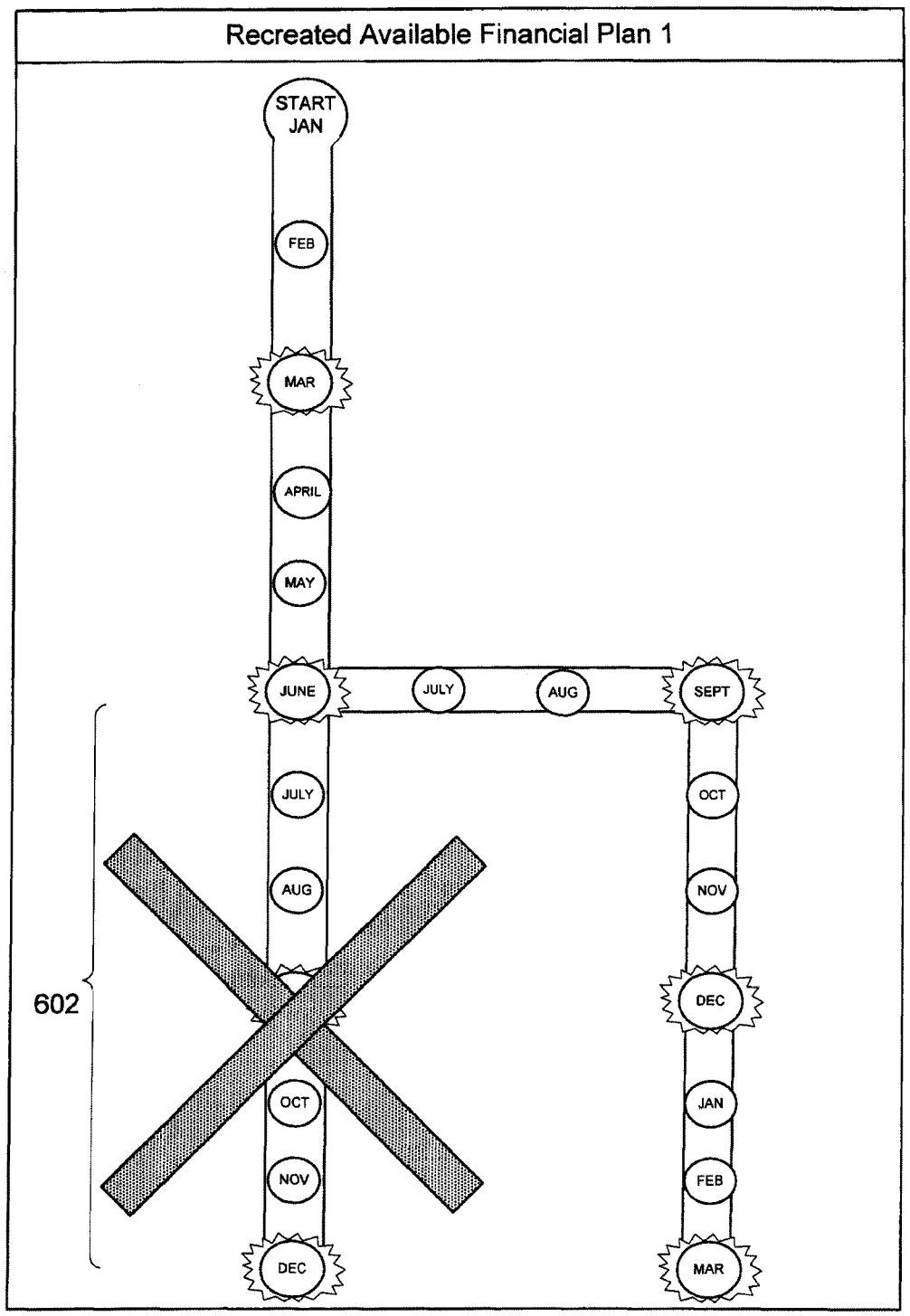
FIG. 6a    600

SYSTEM AND METHOD OF ANALYZING AND MONITORING A CUSTOMER'S FINANCIAL CONDITION

FIELD OF THE INVENTION

The present invention relates to a system and method for analyzing and monitoring a customer's financial condition.

BACKGROUND OF THE INVENTION

Many customers may become overwhelmed by the complexities of various financial service products when making a determination of which products meet their financial needs. In addition to being overwhelmed when making this determination, many customers may also be concerned with the strength of their financial condition relative to their peers' financial condition. Although this type of anxiety may be considered common in many customers, these customers rarely have insight into their peers' financial stability, such as for example, their peers' salary and/or asset holdings.

SUMMARY OF THE INVENTION

At least one exemplary embodiment may provide a computer-implemented method for analyzing and monitoring a customer's financial condition. This embodiment may include storing a financial profile associated with a customer, determining a peer group of financial profiles for the customer, comparing the financial profile associated with the customer to the peer group of financial profiles, developing one or more financial plans based on the financial profile and comparison information, implementing a financial plan, and monitoring the financial plan. The financial profile includes at least financial information about the customer and financial goals of the customer.

Embodiments may also provide a computer-implemented method for analyzing and monitoring a customer's financial condition. These embodiments may include a customer interface module to store a financial profile associated with a customer, a customer comparison module to determine a peer group of financial profiles for the customer and compare the financial profile associated with the customer to the peer group of financial profiles, a processor module to develop one or more financial plans based on the financial profile and comparison information, and a financial planning module to implement and monitor a financial plan. The financial profile includes at least financial information about the customer and financial goals of the customer.

Additional embodiments may provide a financial health meter system for analyzing and monitoring a customer's financial condition. These embodiments may include storing a financial profile associated with a customer, determining a peer group of financial profiles for the customer, comparing the financial profile associated with the customer to the peer group of financial profiles, developing one or more financial plans based on the financial profile and comparison information, implementing a financial plan including creating one or more documents associated with a financial plan, and monitoring the financial plan including monitoring one or more target checkpoints. The financial profile includes at least financial information about the customer and financial goals of the customer.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

The present invention, together with further objects and advantages, may best be understood by reference to the following description taken in conjunction with the accompanying drawings, in the several Figures of which like reference numerals identify like elements, and in which:

FIG. 4c depicts an exemplary embodiment of a customer-based interface displaying a screen display of an available financial plan based on a financial profile according to at least one embodiment of the disclosure;

FIG. 6a depicts an exemplary embodiment of a customer-based interface displaying a screen display of a recreated available financial plan based on a financial profile according to at least one embodiment of the disclosure;

DETAILED DESCRIPTION

Figure 1A:
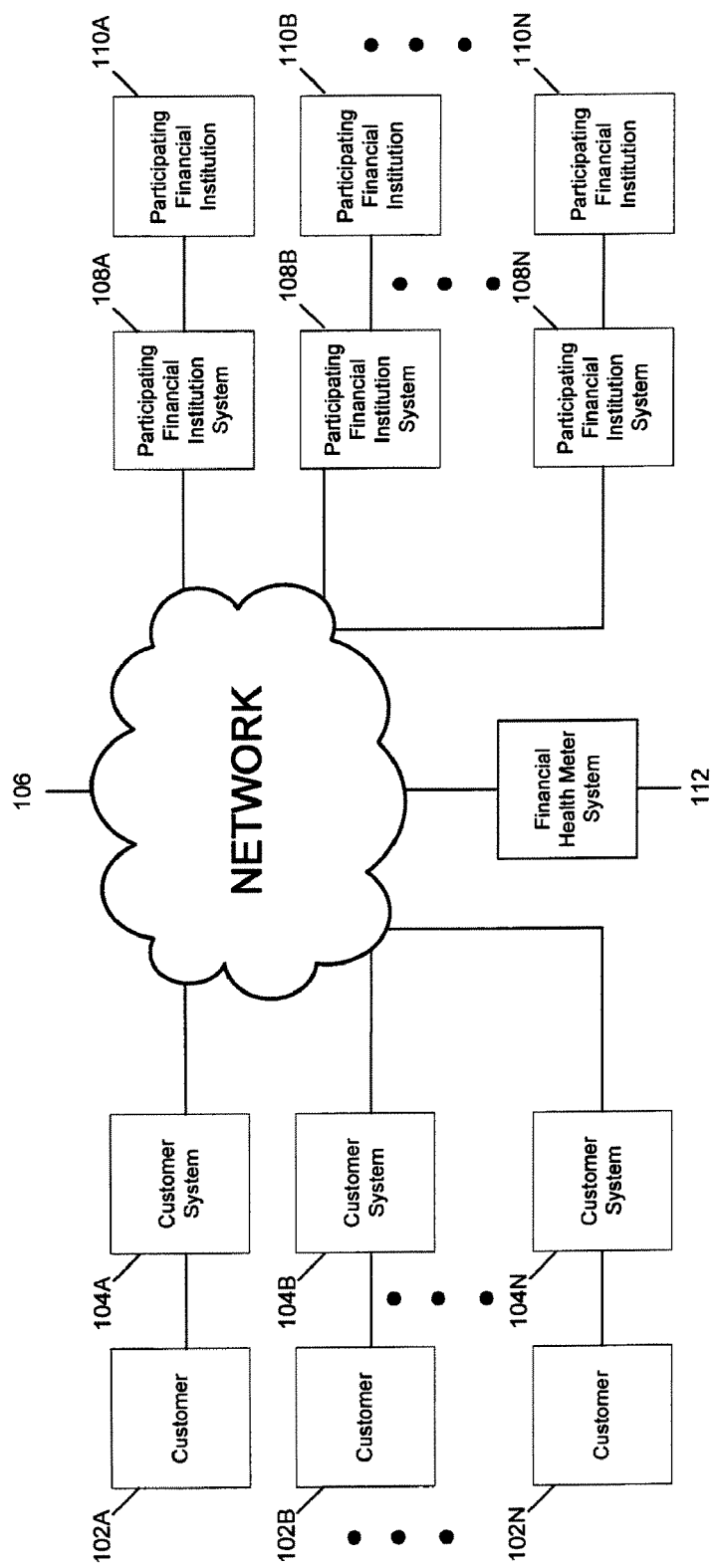
FIG. 1a depicts a system level block diagram illustrating components of a system for analyzing and monitoring a customer's financial condition according to at least one embodiment of the disclosure.

The following description is intended to convey a thorough understanding of the embodiments described by providing a number of specific embodiments and details involving systems and methods for analyzing and monitoring a customer's financial condition. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending on specific design and other needs.

A financial health meter system may interact with individual customers and participating financial institutions to process, implement, and monitor a financial plan on behalf of a customer. To interact with the customer and one or more participating financial institutions, the financial health meter system may function as a host system that receives a financial profile associated with financial goals from the customer and one or more offers from the one or more participating financial institutions as input.

To interact with the financial health meter system, the one or more participating financial institutions may send offers associated with a customer's financial profile and/or may buy advertising space on the customer-based interface portion of the financial health meter system.

The financial health meter system may process the customer's financial profile by comparing the customer's financial condition to their peers' financial condition. Additionally, the financial health meter system may receive one or more offers associated with the customer's financial profile from one or more participating financial institutions. In various embodiments, the financial health meter system may receive one or more offers associated with the customer's financial profile from one or more financial institutions associated with the financial health meter system.

Based on the result of the comparison, the one or more offers, and the financial goals associated with the customer's financial profile, the financial health meter system may process, create, and output one or more financial plans to a customer system associated with the customer. The customer may select one, if any, of the one or more financial plans. The financial health meter system may then implement and monitor the financial plan selected by the customer. If, for example, the customer fails to remain on schedule with the implemented financial plan, the financial health meter system may re-process, re-create, and output one or more financial plans to a customer system associated with the customer.

According to various embodiments of the disclosure, a customer may interact with a financial health meter system to create a customer account and/or a financial profile. A customer may create a customer account using a customer system associated with an interface such as, for example, a web browser, to input information associated with the customer such as, for example, the customer's name, the customer's telephone number, the customer's address, the customer's cellular telephone number, and/or the customer's e-mail address into the financial health meter system. The customer system may transmit the information associated with the customer from the customer system to the financial health meter system using a network. Upon receiving the information associated with the customer, the financial health meter system may assign a unique customer account number and/or password to that particular customer and store the information associated with the customer account.

In various embodiments, a financial profile may include associated financial profile information, which may include a personal information portion, a loan information portion, a deposit account information portion, an investment information portion, a credit information portion, an insurance information portion, and/or a tax information portion.

A personal information portion may include personal information associated with the customer. Personal information may include, for example, a customer's name, age, address, social security number, salary, bonus information, financial goals, and/or other like information. A financial health meter system may provide a predetermined list of financial goals for the customer to select. The predetermined list of financial goals may include goals associated with increasing liquid savings, increasing long-term investments, decreasing Annual Percentage Rates ("APRs"), increasing average Annual Percentage Yields ("APYs"), decreasing debt, and/or any other like financial goals. Once selected, the financial goals may be associated with the customer.

A loan information portion may include loan information associated with the customer. Loan information may include a loan type such as, for example, car loan, mortgage, and/or student loan. Loan information may also include a loan number, a current balance, a current APR, and/or a term (e.g., an amount of time remaining before the loan is paid off). A loan number may include a unique number assigned to a loan which may be used to identify that particular loan.

A deposit account information portion may include deposit account information associated with the customer. Deposit account information may include a deposit account type such as, for example, traditional savings account, money market account, checking account, and/or other deposit account. Deposit account information may also include an account number, a bank routing number, a current balance, an APY, and/or an average balance. An account number may include a unique number assigned to each account which may be used to identify the particular account. A bank routing number may include a unique number assigned to a bank where a deposit account may have been established, which may be used to identify and access that particular bank.

An investment information portion may include investment information associated with the customer. Investment information may include an investment types such as, for example, mutual fund, 401K, Certificate of Deposit ("CD"), and/or Individual Retirement Account ("IRA"). Investment information may also include a current balance and/or an amount of the average monthly contribution.

A credit information portion may include credit information associated with the customer. Credit information may include one or more credit scores such as, for example, one or more credit scores from one or more major credit reporting agencies. Major credit reporting agencies may include, for example, Experian, Equifax, and/or TransUnion. Credit information may also include one or more accounts associated with a line of credit for the customer (i.e., credit account and/or equity line of credit). Credit account information may also include the current credit balance, current amount due, credit account standing, credit card company information, and/or an amount of time remaining before the balance is paid off for each credit account.

An insurance information portion may include insurance information associated with the customer. Insurance information may include an insurance type such as, for example, home owner's insurance, car insurance, life insurance, and/or health insurance. Insurance information may also include a policy provider, policy number, average premium payment, and/or average deductible amount for each insurance type.

A tax information portion may include tax information associated with the customer. Tax information may include tax rate, average yearly federal and state tax deductions for any number of past years (i.e., past 5 years), and/or average yearly federal and state tax returns for any number of past years (i.e., past 5 years). A tax rate may include the percentage rate at which a customer's gross income may be taxed on an annual basis.

In various embodiments, a financial profile which may be displayed to a customer using an interface, such as for example, a web browser, may contain pre-filled fields that include information already provided by the customer in the customer's financial profile and/or information accessible by the financial health meter system. For example, where accounts are known to the financial health meter system by virtue of being associated with a financial institution associated with the financial health meter system, the system may populate fields associated with the respective accounts into the interface. Upon completion of inputting financial profile information associated with a financial profile, the customer may send the financial profile to a financial health meter system for verification. For example, a customer may send a financial profile to a financial health meter system by transmitting the financial profile across a network using a customer system. The customer may also send a financial profile to a financial health meter system by mailing a hard copy including a printout of the financial profile in the form of a letter to a customer representative associated with the financial health meter system, who may then input the financial profile into the financial health meter system.

In various embodiments, a financial health meter system may transmit notification to a customer that their financial profile has been verified. For example, to send notification a financial health meter system may transmit an electronic mail ("Email") message to a customer's account inbox associated with and/or accessible via the customer system. The financial health meter system may also request that the customer update the financial profile to add, modify, and/or correct information that may not be verified and/or may be necessary for verification. In various embodiments, the customer may complete all or part of the financial profile.

A financial health meter system may compare one or more portions of a financial profile associated with a customer to one or more substantially similar portions of one or more financial profiles associated with individuals within the customer's peer group. A peer group may represent one or more individuals similarly situated with a customer relative to one or more age groups, income, debt, debt-to-income ratios, demographic profile, location, gender, and/or any other peer-related benchmarks. For example, a financial health meter system may compare a credit information portion of a financial profile associated with a customer to one or more credit information portions of one or more financial profiles associated with individuals within the customer's peer group. Accordingly, the financial health meter system may calculate the average and/or median of all the credit scores associated with individuals within the customer's peer group and output to the customer system the average and/or median credit score and the customer's credit score to the customer.

In various embodiments, a financial health meter system may determine that the credit scores associated with the individuals within the customer's peer group may include overly skewed data and, therefore, may not be an accurate indication of a typical credit score value. Overly skewed data may include data associated with a large amount by which a normal distribution may be asymmetric to the left and/or to the right of the normal distribution. Accordingly, a financial health meter system may calculate the median of all the credit scores associated with individuals within the customer's peer group and output to a customer system associated with a customer, the median credit score, the average credit score, and the customer's credit score.

Based on the results of one or more comparisons by a financial health meter system, a customer may add and/or modify the financial goals associated with the personal information portion of their financial profile. Accordingly, a financial health meter system may add and/or modify the customer's financial profile within the financial health meter system.

A participating financial institution may include an institution (e.g., a bank, a credit card company, an insurance company, a financial services firm, and/or other like financial institution) that may offer financial services and financial products, and that may create a participating financial institution account with a financial health meter system using, for example a participating financial institution system.

A participating financial institution may interact with a financial health meter system and may create a participating financial institution account to access portions of a financial profile associated with a customer. A participating financial institution may also interact with a financial health meter system by sending offers associated with one or more financial profiles to a financial health meter system. Participating financial institutions may also interact with a financial health meter system by buying advertisement space on the customer-based interface portion of the financial health meter system.

A participating financial institution may create a participating financial institution account using a participating financial institution system associated with an interface such as, for example, a web browser, to input information associated with the participating financial institution. This information may include the participating financial institution's telephone number and/or the participating financial institution's address. A participating financial institution system may transmit the information associated with a participating financial institution to a financial health meter system using a network. Upon receiving the information associated with a participating financial institution, a financial health meter system may assign a unique participating financial institution account number to that particular participating financial institution and store the information associated with the participating financial institution account.

Based on the financial profile information associated with the financial profile completed by a customer, a participating financial institution may offer the customer one or more financial services and/or products relevant to the portion of the financial profile completed by the customer. A financial health meter system may process one or more offers associated with a financial profile from one or more participating financial institutions and/or one or more financial institutions associated with the financial health meter system to create one or more available financial plans for the customer.

An available financial plan may include a potential course of action to assist a customer in achieving one or more financial goals. A course of action may include investment, saving, and/or spending options. An available financial plan may be based on a financial profile, one or more offers associated with the financial profile from participating financial institutions and/or a financial institutions associated with the financial health meter system, and/or the result of a peer group comparison.

In various embodiments, a customer may accept and/or select one of the one or more available financial plans created by the financial health meter system. Accordingly, a financial health meter system may implement the financial plan selected by the customer. In various embodiments, to implement the financial plan, the financial health meter system may create one or more documents (e.g., credit card application, loan application, checking account application, 401K application, Individual Retirement Account ("IRA") application, and/or other like documents) to assist in transferring information to the participating financial institution and/or financial institution associated with the financial health meter system whose offer may have been associated with the implemented financial plan.

In these embodiments, the documents may contain pre-filled fields that include information already provided by a customer in the customer's financial profile and/or information accessible by a financial health meter system.

A customer may not accept any available financial plans created by a financial health meter system. Accordingly, a customer may wait for a financial health meter system to create additional financial plans.

Once a financial health meter system has implemented a financial plan associated with a customer, the system may monitor the customer's progress by scanning one or more target checkpoints. A target checkpoint may include a date determined by the financial plan. A target checkpoint may also be associated with one or more intermediate financial goals. In various embodiments, an intermediate financial goal may include one or more actions that may amount to making progress toward one or more financial goals associated with the financial profile. For example, if the customer indicated a financial goal of "increase liquid savings" in their financial profile, an intermediate financial goal may be to "increase savings account balance by $1,000."

To monitor the customer's progress, the financial health meter system may compare the one or more intermediate financial goals associated with the target checkpoint to the customer's current financial condition on the date associated with the target checkpoint. The customer's current financial condition may include the current state of all of the financial accounts associated with the customer's financial profile. Comparing may include the financial health meter system accessing one or more financial accounts associated with the customer using the financial profile.

If, for example, the financial health meter system determines that the one or more intermediate financial goals associated with the target checkpoint have been met, the financial health meter system may continue to monitor the implemented financial plan. If, however, the financial health meter system determines that the one or more intermediate financial goals associated with the target checkpoint have not been met, the financial health meter system may create and output to the customer system one or more additional financial plans to place the customer back on track to meeting their financial goals associated with their financial profile. Additionally, the financial health meter system may output feedback to the customer system to assist the customer with meeting intermediate financial goals.

By way of a non-limiting example, a customer may input information into the personal information portion, loan information portion, deposit account information portion, credit information portion, and/or insurance information portion of their financial profile. In the personal information portion of the financial profile, the customer may list "increase liquid savings" and "decrease debt" as financial goals.

In the loan information portion of the financial profile, the customer may list a federal student loan with a balance of $26,000 at a 7.6% APR and a private student loan with a balance of $17,000 at a 8.2% APR. In addition, in the loan information portion of the financial profile, the customer may list a car loan with a balance of $2,000 at a 12.6% APR.

In the deposit account portion of the financial profile, the customer may list a checking account with a balance of $6,000 at a 0.5% APY and a savings account with a balance of $1,000 at a 1.25% APY.

In the credit information portion of the financial profile, the financial health meter system may have accessed the customer's credit report from one or more major credit reporting agencies and pre-filled credit information. The credit information may include the customer's credit score of 620, the existence of a credit account in delinquency with a balance of $127.45, and/or a total credit account debt of $7,500.

In the insurance information portion of the financial profile, the customer may list a car insurance policy with high premiums and high deductibles. The financial health meter system may determine that the premiums and/or deductibles are high using the result of the comparison between the customer's financial condition and one or more individuals within the customer's peer group financial condition.

Once the information in the financial profile has been verified, the financial health meter system may allow the completed portions of the financial profile to be accessed by one or more participating financial institutions and/or one or more financial institutions associated with a financial health meter system.

Based on the completed portions of the financial profile, the financial health meter system may compare the completed portions to substantially similar portions of one or more financial profiles associated with individuals within the customer's peer group. The results of the comparison may indicate, for example, the customer's average and/or median peer maintains a credit score of 675 and less than $2,000 of credit account debt. Accordingly, the financial health meter may output the result of the comparison to the customer system. If, for example, the customer adds and/or modifies the financial profile based on the results of the comparison, the financial health meter may restore the customer's financial profile to include the additions and/or modifications submitted by the customer.

Based on the information associated with the financial profile, the financial health meter system may receive an offer from participating financial institution X for a money market account with a 5.00% APY with a minimum balance of $2,000 and an offer from participating financial institution Y to consolidate the customer's federal and private student loans at a 6.75% APR.

Once the financial health meter system determines that a time requirement to submit offers has expired, the financial health meter system may process the offers, result of the comparison, and the financial profile to create one or more available financial plans. Accordingly, the financial health meter system may access the portions of the financial profile associated with the offers from participating financial institutions X and Y. Upon deciphering that the customer listed the financial goals of "increase liquid savings" and "decrease debt" in the personal information portion of the financial profile and weighing each goal against the entire financial profile, the offers from participating financial institutions X and Y, and the results of the comparison, financial health meter system may create a set of one or more intermediate financial goals associated with the financial profile.

The set of one or more intermediate financial goals created by the financial health meter system may include, for example, to consolidate student loans, pay off car loan, transfer $4,000 of checking account balance and $1,000 of savings account balance to a money market account, pay off a delinquent credit account, begin and maintain a credit account debt pay off plan, and/or change car insurance policy from full coverage to liability. Based on the financial goals listed by the customer in the financial profile, the offers from participating financial institutions X and Y, and the results of the comparison, the financial health meter system may rank the set of one or more intermediate financial goals from the most urgent to the least urgent.

For example, in light of the result of the comparison that the customer's average and/or median peer maintains a credit score of 675, the financial goals of "increase liquid savings" and "decrease debt," and the offers from participating X and Y, the financial health meter system may rank the intermediate financial goals from most urgent to least urgent in the following manner: pay off a delinquent credit account, transfer $4,000 of checking account balance and $1,000 of savings account balance to a money market account, to consolidate student loans, pay off car loan, begin and maintain a credit account debt pay off plan, change car insurance policy from full coverage to liability. Based on this ranking, the financial health meter system may create one or more available financial plans. The one or more available financial plans may include a schedule for beginning and meeting each of the intermediate financial goals.

For example, one available financial plan may schedule for the customer to pay off the delinquent credit account and transfer $4,000 of checking account balance and 1,000 of savings account balance to a money market account by the month of March, consolidate student loans, pay off car loan, and begin and maintain a credit account debt pay off plan by the month of June, and change car insurance policy from full coverage to liability by the month of September. The financial health meter system may randomly create one or more available financial plans for the customer in varying degrees of risk tolerance. Risk tolerance may include the amount of financial resources a customer may be able to contribute to maintain the financial plan. The customer may select an available financial plan that most closely indicates the amount of risk tolerance the customer may be able to maintain.

If, for example, the customer selects the available financial plan previously described, the financial health meter system may implement the financial plan. To implement the financial plan, the financial health meter system may output a graphical representation of the schedule of intermediate goals for the customer to meet. Additionally, the financial health meter system may create a pre-filled money market account application for the customer and may also electronically transmit the money market account application to participating financial institution X once the customer has completed the application.

The financial health meter system may create a pre-filled student loan consolidation application for the customer and may also electronically transmit the student loan consolidation application to participating financial institution Y once the customer has completed the application. In various embodiments, the financial health meter system may electronically transfer funds from one or more accounts associated with the customer to one or more accounts established through the financial health meter system.

Following this example, to implement the financial plan, the financial health meter system may also check each target checkpoint (e.g., March, June, and September) to determine whether the customer has maintained the implemented financial plan. If, for example, the financial health meter system determines that the customer did not pay off the car loan in the month of June, the financial health meter system may create another set of one or more available financial plans for the customer to select from to reschedule the customer's set of one or more intermediate financial goals.

Referring now to FIG. 1a, a system level block diagram illustrating components of a system 100 for analyzing and monitoring a customer's financial condition according to at least one embodiment of the disclosure is depicted. The system 100 may include one or more customer systems 104A-104N, a network 106, one or more participating financial institution systems 108A-108N, and a financial health meter system 112.

The system 100 may be in communication with network 106. Network 106 may include an analog telephone network, a digital telephone network, a cellular telephone network, a public wide area network ("WAN"), such as the Internet, or, different connections, such as combinations of public and private WANs, local areas networks ("LANs"), wireless LANs, encrypted networks, body area networks, or other wired or wireless networks. In exemplary embodiments of the disclosure, network 106 may include one, or any number of the exemplary types of networks mentioned above operating as a stand-alone network or in cooperation with each other. Use of the term network herein is not intended to limit the network to a single network.

Customer systems 104A-104N, participating financial institution systems 108A-108N, and financial health meter system 112 may be in communication with or have access to network 106. For example, customer systems 104A-104N, participating financial institution systems 108A-108N, and financial health meter system 112 may communicate with each other using network 106.

One or more customers 102A-102N may interact with financial health meter system 112 using, for example, customer systems 104A-104N, respectively. Customer systems 104A-104N may be in communication with financial health meter system 112 via network 106. Customer systems 104A-104N may include, but are not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging device, an alert device, a television, an interactive television, a receiver, a tuner, a high definition (HD) television, an HD receiver, a video-on-demand (VOD) system, a server, or other device. In various embodiments, customer systems 104A-104N may also include an interface to display information received from financial health meter system 112 over network 106.

Those of ordinary skill in the art will appreciate that a plurality of potential customer systems 104A-104N may be used by respective customers 102A-102N to input and access a financial profile and to access and select an available financial plan. For example, where network 106 includes the Internet, customer systems 104A-104N may interact with financial health meter system 112 to input financial profile information associated with a financial profile, access the financial profile, available financial plans, and select a financial plan via a web browser client installed on the customer systems 104A-104N, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively.

In various embodiments, customer 102A may use a telephone to communicate with a customer service representative associated with a financial health meter system 112, and the customer service representative may create or change the customer's financial profile in financial health meter system 112. Customer 102A may also send a financial profile through the mail, for example in the form of a letter, or via facsimile to a customer service representative that may receive the financial profile and may create or change the customer's financial profile in financial health meter system 112.

One or more participating financial institutions 110A-110N may interact with financial health meter system 112 using, for example, participating financial institution systems 108A-108N. Participating financial institution systems 108A-108N may be in communication with financial health meter system 112 via network 106. Participating financial institution systems 108A-108N may include, but are not limited to: e.g., any computer device, or communications device including, e.g., a personal computer (PC), a workstation, a mobile device, a phone, a handheld PC, a personal digital assistant (PDA), a thin system, a fat system, network appliance, an Internet browser, a paging, an alert device, a television, an interactive television, a receiver, a tuner, a high definition (HD) television, an HD receiver, a video-on-demand (VOD) system, a server, or other device. In various embodiments, participating financial institution systems 108A-108N may also include an interface to access information received from financial health meter system 112 via network 106.

Those of ordinary skill in the art will appreciate that a plurality of potential participating financial institution systems 108A-108N may be used by participating financial institutions 110A-110N to access one or more financial profiles of various customers and input one or more financial offers. For example, where network 106 includes the Internet, participating financial institution system 108A may interact with financial health meter system 112 to access financial profiles of various customers and input financial offers via a web browser client installed on participating financial institution's computer system 108A, such as INTERNET EXPLORER, NAVIGATOR, or FIREFOX web browser programs, offered by Microsoft Corporation of Redmond, Wash., Time Warner of New York, N.Y., and the Mozilla Foundation of Mountain View, Calif., respectively.

Figure 1B:
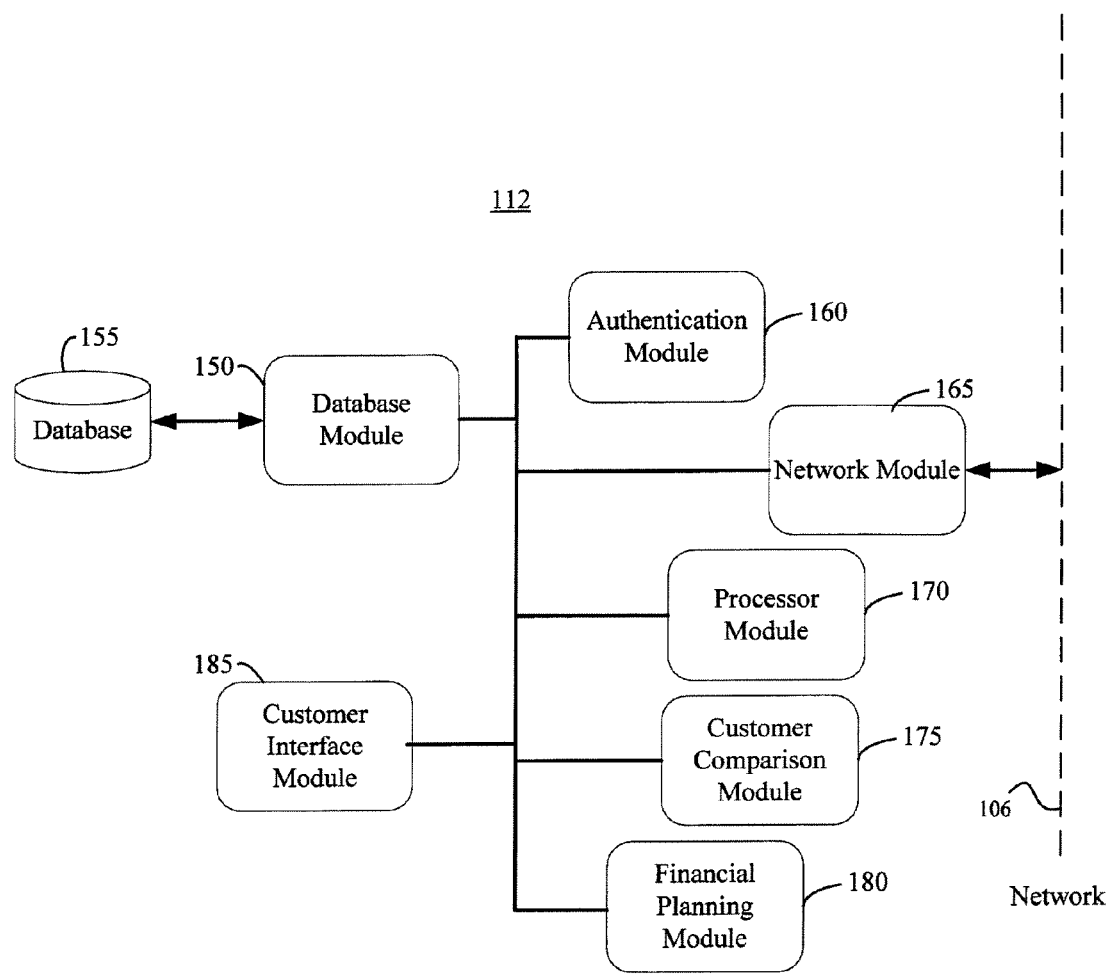
FIG. 1b depicts a system level block diagram illustrating various components of a financial health meter system according to at least one embodiment of the disclosure.

Referring now to FIG. 1b, a system level block diagram illustrating the various components of a financial health meter system 112 according to at least one embodiment of the disclosure is depicted. As shown in FIG. 1b, a financial health meter system 112 may include one or more of the following modules: a database module 150, an authentication module 160, a network module 165, a processor module 170, a customer comparison module 175, a financial planning module 180, and a customer interface module 185. Database module 150, authentication module 160, network module 165, processor module 170, customer comparison module 175, financial planning module 180, and customer interface module 185 may communicate with some or all of the modules of financial health meter system 112. The modules of financial health meter system 112 may be part of a single system, or the modules may be physically or logically separated. Financial health meter system 112 may be operably connected to a network (e.g., network 106) so that the modules of financial health meter system 112 may receive signals from the network and generate signals to the network.

Authentication module 160 may receive authentication information (e.g., as signals from the network 106) to authenticate users into financial health meter system 112. In various embodiments, the authentication information may be received as encrypted ciphertext and decrypted according to protocols well known in the art. In various embodiments, authentication information may include a unique customer account number, the customer's password, the customer's telephone number, the customer's address, the customer's cellular telephone number, and the customer's e-mail address. In various embodiments, authentication information may include a unique participating financial institution account number, the participating financial institution's password, the participating financial institution's telephone number, and the participating financial institution's address.

For example, authentication module 160 may have access to a plurality of customer account and participating financial institution account authentication information. In one exemplary embodiment, authentication module 160 may store data regarding a plurality of customers and participating financial institutions and their related account authentication information in database 155. Authentication module 160 may be coupled to database 155 such that authentication module 160 may access database 155 through database module 150.

In various embodiments, authentication module 160 may attempt to match the authentication information to a record that may be stored within and/or associated with financial health meter system 112. For example, authentication module 160 may attempt to match the authentication information to a record by comparing the authentication information to data within a plurality of records.

Customer interface module 185 may have access to financial profiles created by each customer. Customer interface module 185 may include software and/or hardware to store and scan the financial profile to determine whether the financial profile at least includes the customer's personal information. As noted above, the customer's personal information may include the customer's name, age, address, social security number, salary, bonus information, and/or financial goals. Customer interface module 185 may also have access to a plurality of verified and/or non-verified financial profiles from one or more customers. In an exemplary embodiment, customer interface module 185 may store the financial profiles in database 155. Customer interface module 185 may be coupled to database 155 such that customer interface module 185 may access database 155 through database module 150.

Customer interface module 185 may verify the information in the financial profile. Financial profile information associated with the customer including personal information, loan information, deposit account information, investment information, credit information, insurance information, and/or tax information may be verified by the customer interface module 185.

Customer interface module 185 may verify the financial profile by verifying the accuracy of the financial profile information associated with the financial profile. This may include customer interface module 185 accessing the customer's credit report. Customer interface module 185 may also access information associated with the customer's financial accounts using the financial profile information associated with the financial profile to access the customer's financial accounts.

Customer interface module 185 may also verify the financial profile information associated with the financial profile by accessing information associated with the customer's past interactions with financial health meter system 112. For example, the customer may have established a financial account using financial health meter system 112 and/or another system associated with financial health meter system 112. Accordingly, customer interface module 185 may compare the information associated with a particular customer from past interactions to the information provided by the customer in the financial profile for accuracy. For example, if the customer owns a checking account with a financial institution associated with the financial health meter system, the financial health meter system may access the checking account information to verify whether the inputted information matches the checking account information.

Customer interface module 185 may also determine that amounts within $100 or less may be considered verified. Customer interface module 185 may determine the greatest amount by which two compared accounts may differ to consider them verified. Customer interface module 185 may verify accounts with equal amounts. Customer interface module 185 may also store the financial profile that has completed the verification process as a verified financial profile.

Customer comparison module 175 may include software and/or hardware to compare one or more data fields associated with portions of the customer's financial profile to one or more data fields associated with substantially similar portions of financial profiles and/or information accessible by the financial health meter system associated with individuals within the customer's peer group. The customer's peer group may include individuals within any number of years of the customer's age (e.g., ±4 years). Customer comparison module 175 may determine the range of individuals' age that fall within the customer's peer group by subtracting a number of years and adding the number of years to the customer's age. If, for example, the customer is 35 years old, customer comparison module 175 may determine the range of individuals within the customer's peer group to be from age 31 to age 39, by subtracting a number of years of 4 and adding a number of years of 4 to the customer's age of 35, respectively.

The customer's peer group may also include similarly situated individuals relative to one or more age groups, income, debt, debt-to-income ratios, demographic profile, location, gender, and/or any other peer-related benchmarks.

Customer comparison module 175 may access one or more financial profiles and/or information accessible by a financial health meter system associated with individuals within the customer's peer group in database 155 through database module 150 using network 106. Customer comparison module 175 may access the customer's verified financial profile in customer interface module 185 using network 106. In various embodiments, customer comparison module may access the customer's verified financial profile in database 155 through database module 150 using network 106.

Customer comparison module 175 may scan each portion of each financial profile and/or information accessible by the financial health meter system associated with individuals within the customer's peer group to group substantially similar portions of the customer's financial profile with substantially similar portions of the financial profiles and/or information accessible by the financial health meter system associated with individuals within the customer's peer group. Customer comparison module 175 may scan and store each data field value for each substantially similar data field of each financial profile and/or or information accessible by the financial health meter system associated with individuals within the customer's peer group.

For example, customer comparison module 175 may group the credit information of the customer with the credit information of five random financial profiles associated with individuals within the customer's peer group. Customer comparison module 175 may also match the credit score data field of the customer's financial profile to the credit score data fields of the five financial profiles associated with individuals within the customer's peer group. Customer comparison module 175 may also scan each of the five financial profiles for the credit score associated with the individuals within the customer's peer group. Accordingly, customer comparison module 175 may scan and store the values of 674, 669, 687, 676, and 702 associated with the individuals within the customer's peer group.

Customer comparison module 175 may calculate the average and/or median value of similar stored values associated with individuals within the customer's peer group. Customer comparison module 175 may also calculate the average value of the similar stored values by adding all similar stored values and dividing by the number of stored values.

Customer comparison module 175 may also calculate the median value of the similar stored values by arranging them in order of least to greatest and storing the value that may be located in the middle of the arrangement of the values if the amount of similar stored values is an odd number. If the amount of similar stored values is an even number, the customer comparison module 175 may calculate the median value as the mean value of the two values that may be located in the middle of the arrangement of values.

Customer comparison module 175 may store and output the average and/or median value for each data field type in the customer's financial profile grouped with a substantially similar data field type of each financial profile and/or or information accessible by the financial health meter system associated with individuals within the customer's peer group. The average and/or median value may represent the average and/or median value of the peers of the customer for a particular data field type.

Customer comparison module 170 may transmit the average and/or median value for each data field type in the customer's financial profile grouped with a substantially similar data field type of each financial profile and/or or information accessible by the financial health meter system associated with individuals within the customer's peer group to customer interface module 185 to enable transmission and subsequent display of the one or more of the average and/or median values to the customer.

For example, if the customer comparison module 175 scanned and stored the values of 674, 669, 687, 676, and 702 from the credit score data field associated with five financial profiles associated with individuals within the customer's peer group, the customer comparison module 175 may calculate the average credit score of the peers to be 681.6 and the median credit score of the peers to be 676.

In various embodiments, customer comparison module 175 may calculate a threshold value for each data field type that may be associated with an average value. The threshold value may include the standard deviation value associated with a group of similar stored values. For example, the customer comparison module 175 may calculate the standard deviation of the similar stored values of 674, 669, 687, 676, and 702 to be 13.16. The threshold value may be calculated using methods known to those of ordinary skill in the art to calculate the standard deviation.

Customer comparison module 175 may assign a score to each data field type associated with the customer's financial profile that may have an associated threshold value. When the customer may benefit the most by increasing the value associated with the data field type, customer comparison module 175 may assign a score of zero, one, two, three, etc., to a data field type. If the value associated with the data field type is greater than or equal to the total of the average peer value associated with the data field type minus the threshold value that data field type may be assigned a score of zero. If the value associated with the data field type is greater than or equal to the total of the average peer value associated with the data field type minus double the threshold value that data field type may be assigned a score of one. If the value associated with the data field type is greater than or equal to the total of the average peer value associated with the data field type minus triple the threshold value that data field type may be assigned a score of two. Customer comparison module 175 may continue this process until each data field type has been assigned a score.

In various embodiments, when the customer may benefit the most by decreasing the value associated with the data field type, customer comparison module 175 may assign a score of zero, one, two, three, etc., to a data field type. If the value associated with the data field type is less than or equal to the total of the average peer value associated with the data field type plus the threshold value that data field type may be assigned a score of zero. If the value associated with the data field type is less than or equal to the total of the average peer value associated with the data field type plus double the threshold value that data field type may be assigned a score of one. If the value associated with the data field type is less than or equal to the total of the average peer value associated with the data field type plus triple the threshold value that data field type may be assigned a score of two. Customer comparison module 175 may continue this process until each data field type has been assigned a score.

If, for example, the customer's credit score data field type includes a value of 620 and the average peer value credit score includes a value of 681.6 then a threshold value may be determined to be 13.16. Customer comparison module 175 may determine that it may be most beneficial to the customer to increase the customer's credit score. Customer comparison module 175 may determine which score to assign to the customer's credit score data type. Based on the calculation discussed above, the customer's credit score would be greater than 615.8, therefore, the customer comparison module 175 may assign a score of 4 to the customer's credit score data field type. Customer comparison module 175 may store the scores assigned to the customer's data field types associated with the customer's financial profile.

Whether the customer may benefit the most by decreasing and/or increasing the value associated with one or more data field types may be established by the implementers of the financial health meter system 112.

Processor module 170 may include software and/or hardware to process the financial profile, one or more offers associated with the financial profile from participating financial institutions and/or a financial institution associated with the financial health meter system 112, and/or the result of the customer's financial condition comparison to the financial condition of individuals within the customer's peer group to create one or more available financial plans. Processor module 170 may access the customer's verified financial profile in customer interface module 185 using network 106. Processor module 170 may also access the customer's verified financial profile in database 155 through database module 150 using network 106.

Processor module 170 may receive one or more offers from one or more participating financial institutions and/or a financial institution associated with the financial health meter system 112. Processor module 170 may also include software and/or hardware to store and/or manage the one or more offers from the one or more participating financial institutions. Processor module 170 may receive the one or more offers via network 106.

In various embodiments, processor module 170 may establish a time requirement for the participating financial institutions to submit offers regarding a particular financial profile. For example, processor module 170 may establish a time requirement by implementing a predetermined amount of time and activating a clock when the financial profile is initially made accessible to participating financial institutions. The predetermined amount of time may be established by the implementers of the financial health meter system 112.

If, for example, processor module 170 implements an amount of time to allow the participating financial institutions to submit offers of 3 days, when financial health meter system 112 allows the participating financial institutions to access the financial profile, the clock may be activated. Once the clock reaches 3 days, processor module 170 may not receive any additional offers from participating financial institutions and/or financial institutions associated with the financial health meter system. Accordingly, processor module 170 may process offers received within the time requirement for a particular financial profile.

Processor module 170 may access the scores assigned to the one or more data field types associated with the customer's financial profile in customer comparison module 175 using network 106. Processor module 170 may also access the offers from the one or more participating financial institutions using network 106. Processor module 170 may also decipher each of the financial goals listed by the customer in the customer's financial profile.

Processor module 170 may add an additional point to increase the score of each data field type associated with the customer's financial profile that may be effected by one of the offers from the participating financial institutions and/or financial institutions associated with the financial health meter system. Whether a data field type associated with the customer's financial profile may be effected by one of the offers from the participating financial institutions may be established by the implementers of the financial health meter system 112.

Processor module 170 may add an additional point to increase the score of each data field type associated with the customer's financial profile that may be effected by one of the financial goals listed by the customer in the financial profile module. Whether a data field type associated with the customer's financial profile may be effected by one of the financial goals listed by the customer in the financial profile may also be established by the implementers of the financial health meter system 112.

Processor module 170 may arrange all of the data field types associated with the customer's financial profile in order from those associated with the lowest score to those associated with the highest score. Processor module 170 may disregard one or more data field types associated with a score of zero. Processor module 170 may group the arranged data field types into two or more substantially equal groups from data field types associated with the lowest scores to data field types associated with highest scores.

Based on the pre-established determination of whether the customer may benefit the most by decreasing and/or increasing the value associated with one or more data field types, processor module 170 may establish one or more intermediate financial goals for each data field type. In various embodiments, the intermediate financial goals associated with data field types that may be associated with high scores may be determined to be scheduled at the beginning of the financial plan. The intermediate financial goals associated with data field types that may be associated with low scores may be determined to be scheduled toward the middle and/or end of the financial plan.

If, for example, a financial plan has been created for a 12 month period from January 1 to December 31, and paying off a delinquent credit account is an intermediate financial goal that has been determined to be scheduled at the beginning of the financial plan, the first target checkpoint, for example March, may have the goal of paying off the delinquent credit account.

Based on varying degrees of risk tolerance, processor module 170 may create one or more available financial plans to output to the customer. Varying degrees of risk tolerance may include such factors as speed in meeting intermediate financial goals, frequency of target checkpoints, and/or total time period for the available financial plan. Processor module 170 may output the one or more available financial plans.

Processor module 170 may transmit the one or more available financial plans to customer interface module 185 to enable transmission and subsequent display of the one or more available financial plans to the customer.

Financial planning module 180 may include software and/or hardware to implement and monitor a financial plan based on at least the financial profile. Financial planning module 180 may access the financial plan in processor module 170 using network 106. Based on the customer's selection, financial planning module 180 may implement and monitor the financial plan.

To implement the financial plan, financial planning module 180 may initiate the creation of one or more documents to assist in electronically transferring information to the participating financial institution and/or financial institution associated with the financial health meter system whose offer may have been implemented in the financial plan. For example, such a document (e.g., credit card application, loan application, checking account application, 401K application, IRA application, and/or other like documents) may include information such as financial account information such as an account number, routing number associated with a particular bank, account balance, loan balance, and other like information. In these embodiments, the documents may contain pre-filled fields that include information already provided by the customer in the customer's financial profile and/or provided by the financial health meter system 112. Accordingly, information to be transferred may include financial account information such as an account number, routing number associated with a particular bank, account balance, loan balance, and/or other like information.

In various embodiments, to transfer information a financial institution may electronically transmit the customer's financial account information via a network.

To monitor the financial plan, financial planning module 180 may scan each target checkpoint at the associated due date and compare the values associated with the intermediate financial goals to the values presently associated with the customer's financial profile. If, for example, the financial planning module 180 determines that the customer's financial profile is not substantially equivalent to the intermediate financial goals set by financial health meter system 112, financial planning module 180 may transmit the portion of the financial plan that the customer did not meet to processor module 170 for the processor module 170 to re-process more available financial plans for the customer. If, however, the financial planning module 180 determines that the customer's financial profile is substantially equivalent to the intermediate financial goals set by financial health meter system 112, financial planning module 180 may continue to monitor the financial plan.

To monitor the financial plan, financial planning module 180 may also access information associated with one or more accounts associated with the customer's financial profile. In various embodiments, to monitor the financial plan, financial health meter system 112 may request for the customer to input additional information associated with the present state of one or more accounts associated with the customer's financial profile. To request the additional information, financial health meter system 112 may transmit an Email message to an inbox account associated with the customer system, send a hard copy of the request in the mail, and/or call the customer using a customer representative associated with financial health meter system 112.

Financial health meter system 112 may verify the additional information inputted by the customer. To verify the additional information, financial health meter system 112 may access information associated with a customer's past interactions with financial health meter system 112. For example, a customer may have established a financial account using financial health meter system 112 and/or another system associated with financial health meter system 112. Accordingly, financial health meter system 112 may compare the information associated with a particular customer from past interactions to the additional information provided by the customer for accuracy. For example, if the customer owns a checking account with a financial institution associated with financial health meter system 112, financial health meter system 112 may access the checking account information to verify whether the additional inputted information matches.

Financial planning module 180 may transmit a graphical representation of the customer's progress on the implemented financial plan to customer interface module 185 to enable transmission and subsequent display of the customer's progress to the customer.

Customer interface module 185 may transmit the outputs from the modules associated with financial health meter system 112 in a form that a customer may perceive using, for example, a customer system. In various embodiments, customer interface module 185 may be a web server to organize and display information viewable on software installed on a customer system.

Financial health meter system 112 may also include a network module 165 operable to connect the various modules of financial health meter system 112 to network 106. Network module 165 may include any device for connecting network appliances, such as database module 150, authentication module 160, network module 165, processor module 170, customer comparison module 175, financial planning module 180, and customer interface module 185 to network 106.

Financial health meter system 112 may also include database module 150 operable to access and store various information in database 155. Database module 150 may include any device for accessing and storing various information in a database 155. In various embodiments, database 155 may store data regarding one or more customers and one or more participating financial institutions. This data may include one or more financial profiles, customer account authentication information, participating financial institution account authentication information, and one or more offers from one or more participating financial institutions and/or from one or more financial institutions associated with financial health meter system 112. Authentication module 160, processor module 170, customer comparison module 175, financial planning module 180, and customer interface module 185 may be coupled to database 155 such that authentication module 160, processor module 170, customer comparison module 175, financial planning module 180, and customer interface module 185 may access database 155 through database module 150 to store and retrieve data as needed.

Figure 2A:
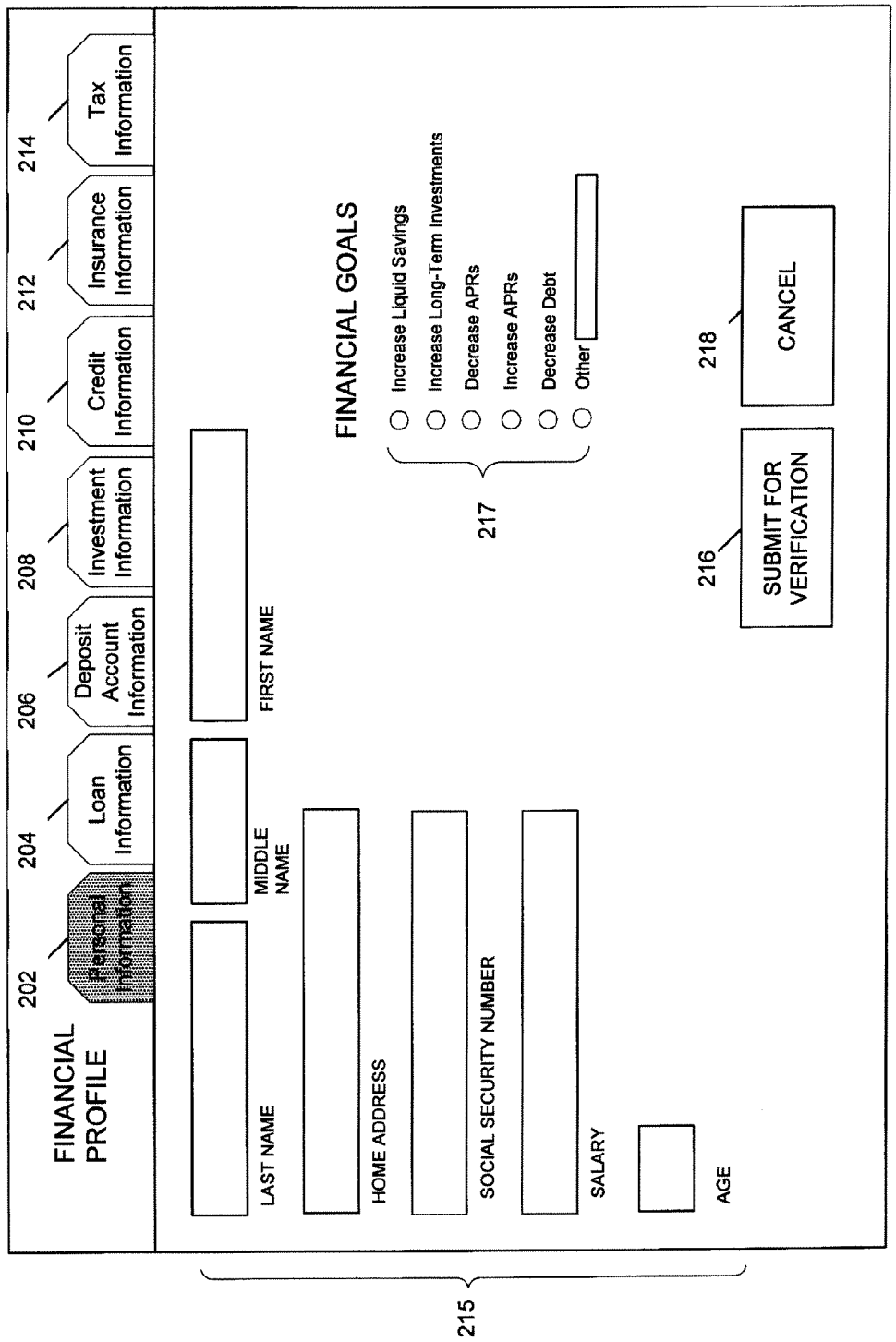
FIG. 2a depicts an exemplary embodiment of a customer-based interface displaying a screen display of a personal information portion of a financial profile according to at least one embodiment of the disclosure.

Referring now to FIG. 2a, an exemplary embodiment of a customer-based interface 200 displaying a screen display of the personal information of a financial profile according to at least one embodiment of the disclosure is depicted. As discussed above, a customer may interact with the financial health meter system using, for example, a web browser installed on a customer system to input and access information. By way of a non-limiting example, the financial profile display screen 200 may be arranged as depicted in FIG. 2a. At the top of the of the financial profile screen, the customer may have the choice to access modules associated with a personal information portion 202, a loan information portion 204, a deposit account information portion 206, an investment information portion 208, a credit information portion 210, an insurance information portion 212, a tax information portion 214, and any other like portion that may be relevant to the customer's financial profile information by clicking on a tab associated with each respective portion.

In various embodiments, the customer may activate one or more buttons 217 associated with a predetermined list of financial goals. The predetermined list of financial goals may include increase liquid savings, increase long-term investments, decrease APRs, increase APYs, decrease debt, and/or other like financial goals. In various embodiments, the customer may fill in a data field associated with other financial goals.

As shown, the personal information portion 202 may include one or more data fields 215 associated with the customer's name, age, address, social security number, salary, bonus information, and financial goals. In various embodiments, when the customer has input information into one, some, or all portions of the financial profile, the customer may submit the financial profile to the financial health meter system for verification by activating (e.g., clicking on) a button 216 associated with verification submission. The customer may also cancel the financial profile and may return back at another time to complete the financial profile by activating a cancellation button 218.

Figure 2B:
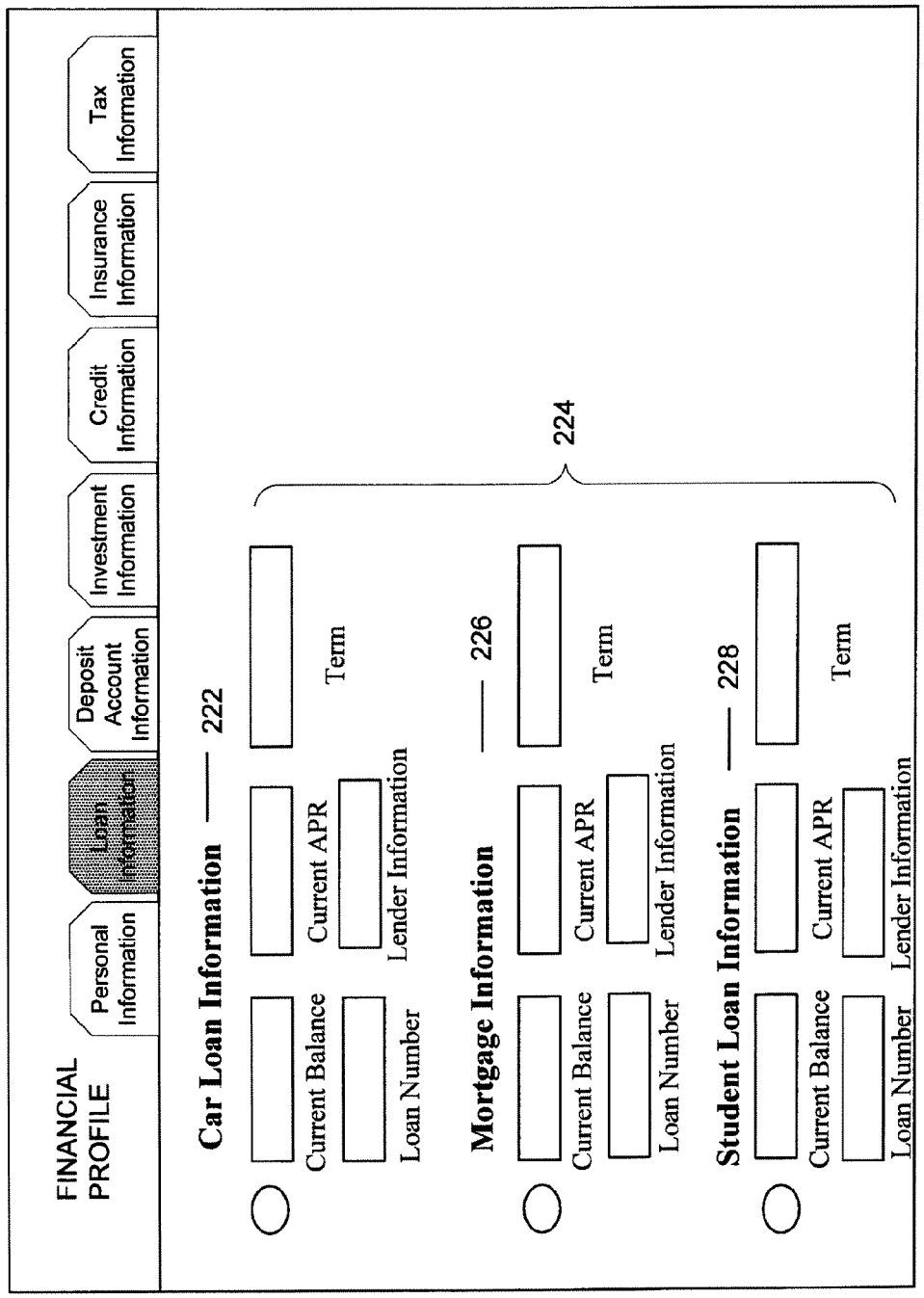
FIG. 2b depicts an exemplary embodiment of a customer-based interface displaying a screen display of a loan information portion of a financial profile according to at least one embodiment of the disclosure.

Referring now to FIG. 2b, an exemplary depiction of a customer-based interface displaying a screen display of data fields 224 associated with the loan information 220 of a financial profile according to at least one embodiment of the disclosure is depicted. As shown, the customer may input their loan information into data fields 224 associated with the loan information portion 204 depicted in FIG. 2a. Loan information may include car loan information 222, mortgage information 226, student loan information 228, and/or any other like information about one or more loans that may be associated with the customer.

For example, the customer may fill in one or more data fields 224 associated with a current loan balance, current APR, term (e.g., number of years remaining to pay off the loan), lender information, and/or loan number.

Figure 2C:
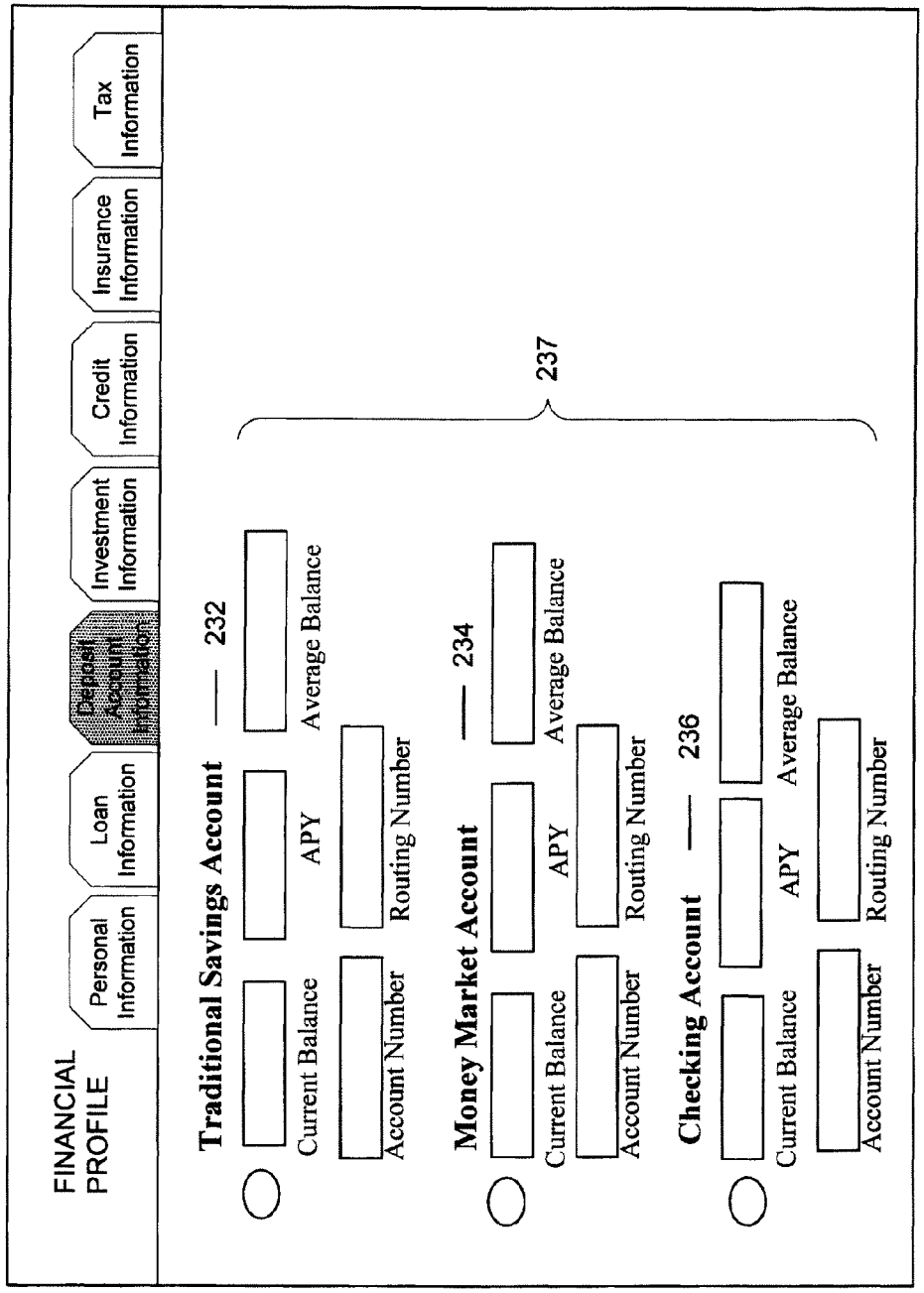
FIG. 2c depicts an exemplary embodiment of a customer-based interface displaying a screen display of a deposit account information portion of a financial profile according to at least one embodiment of the disclosure.

Referring now to FIG. 2c, an exemplary depiction of a customer-based interface displaying a screen display of data fields 237 associated with the deposit account information 230 of a financial profile according to at least one embodiment of the disclosure is depicted. As shown, the customer may input their deposit account information into data fields 237 associated with the deposit account information portion 206 depicted in FIG. 2a. Deposit account information may include traditional savings account deposit account information 232, money market account deposit account information 234, checking account deposit account information 236, and/or any other like information about one or more deposit accounts that may be associated with the customer.

For example, the customer may fill in one or more data fields 237 associated with a current deposit account balance, APY, average balance, account number, and/or routing number.

Figure 2D:
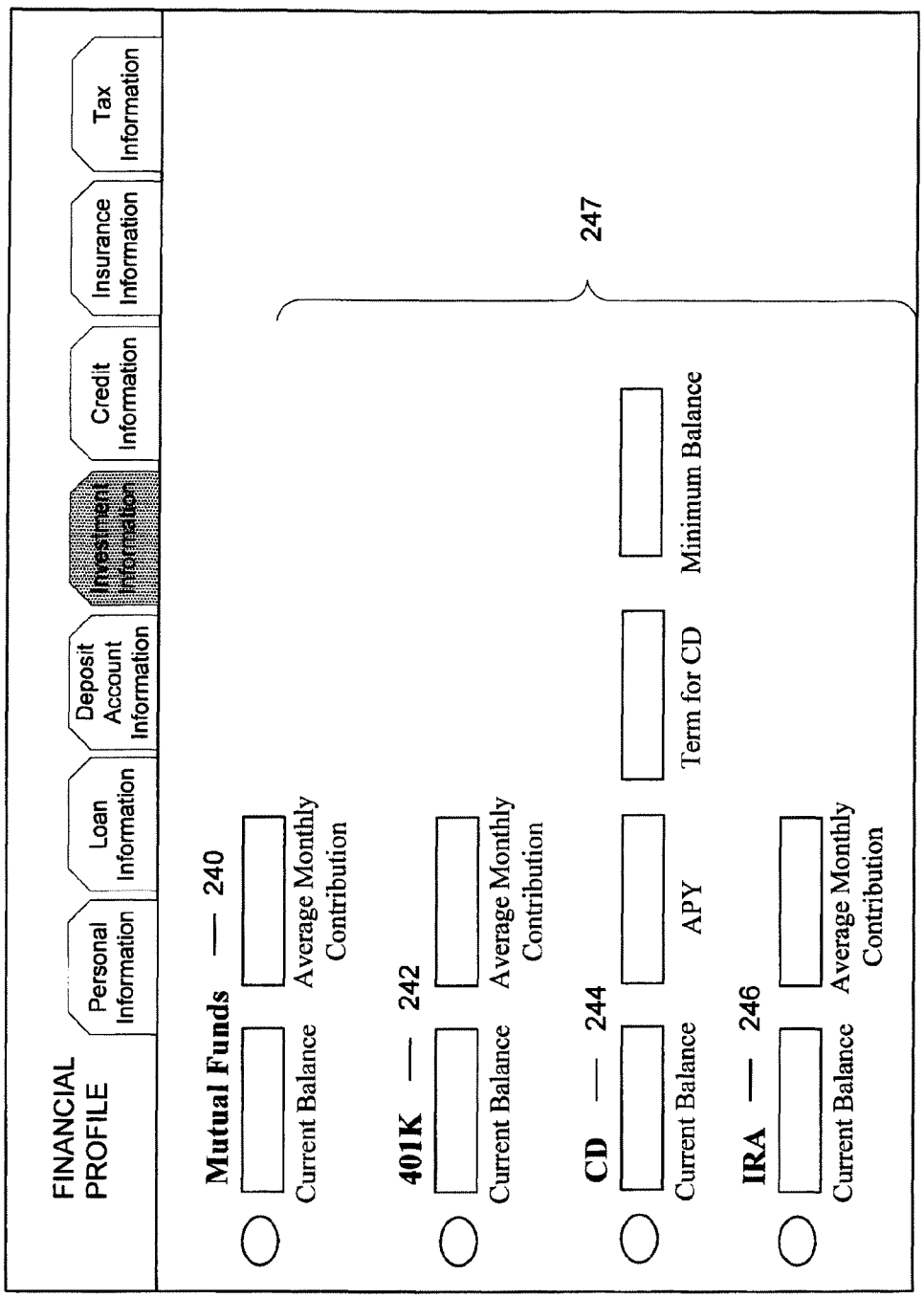
FIG. 2d depicts an exemplary embodiment of a customer-based interface displaying a screen display of an investment information portion of a financial profile according to at least one embodiment of the disclosure.

Referring now to FIG. 2d, an exemplary depiction of a customer-based interface displaying a screen display of data fields 247 associated with the investment information 238 of a financial profile according to at least one embodiment of the disclosure is depicted. As shown, the customer may input their investment information into data fields 247 associated with the investment information portion 208 depicted in FIG. 2a. Investment information may include mutual funds investment information 240, 401K investment information 242, CD investment information 244, IRA investment information 246, and/or any other like information about one or more investments that may be associated with the customer.

For example, the customer may fill in one or more data fields 247 associated with none, one, or more of a current investment balance, average monthly monetary contribution, APY, term for CD, and/or minimum balance.

Figure 2E:
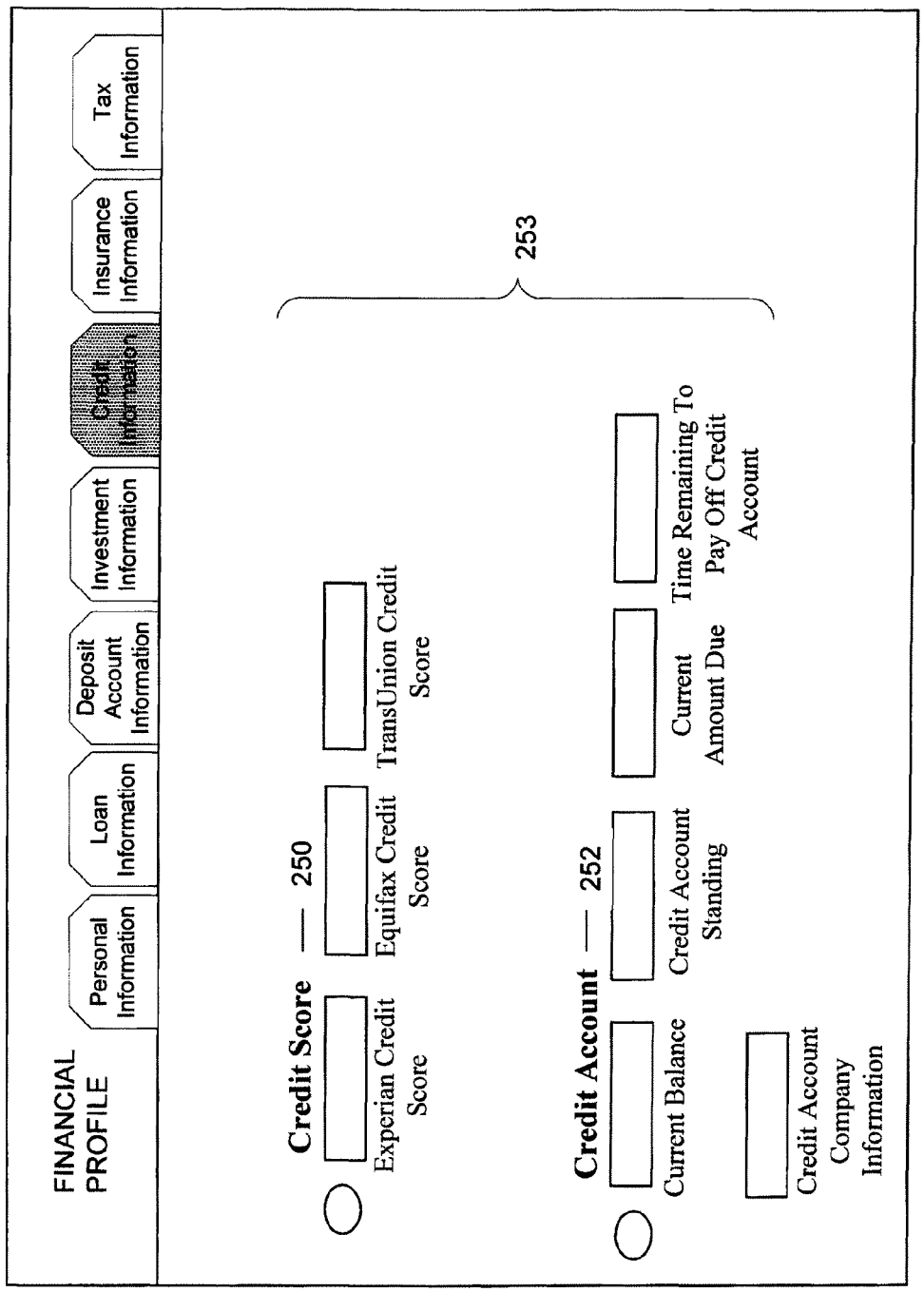
FIG. 2e depicts an exemplary embodiment of a customer-based interface displaying a screen display of a credit information portion of a financial profile according to at least one embodiment of the disclosure.

Referring now to FIG. 2e, an exemplary depiction of a customer-based interface displaying a screen display of data fields 253 associated with the credit information 248 of a financial profile according to at least one embodiment of the disclosure is depicted. As shown, the customer may input their credit information into data fields 253 associated with the credit information portion 210 depicted in FIG. 2a. Credit information may include credit score credit information 250, credit account credit information 252, and/or any other like information about one or more credit accounts that may be associated with the customer.

For example, the customer may fill in one or more data fields 253 associated with credit account balance, credit account standing, current amount due, credit account company information, and/or time remaining to pay off credit account. In various embodiments, data fields 253 associated with the customer's credit information may be pre-filled by the financial health meter system using the customer's credit report.

Figure 2F:
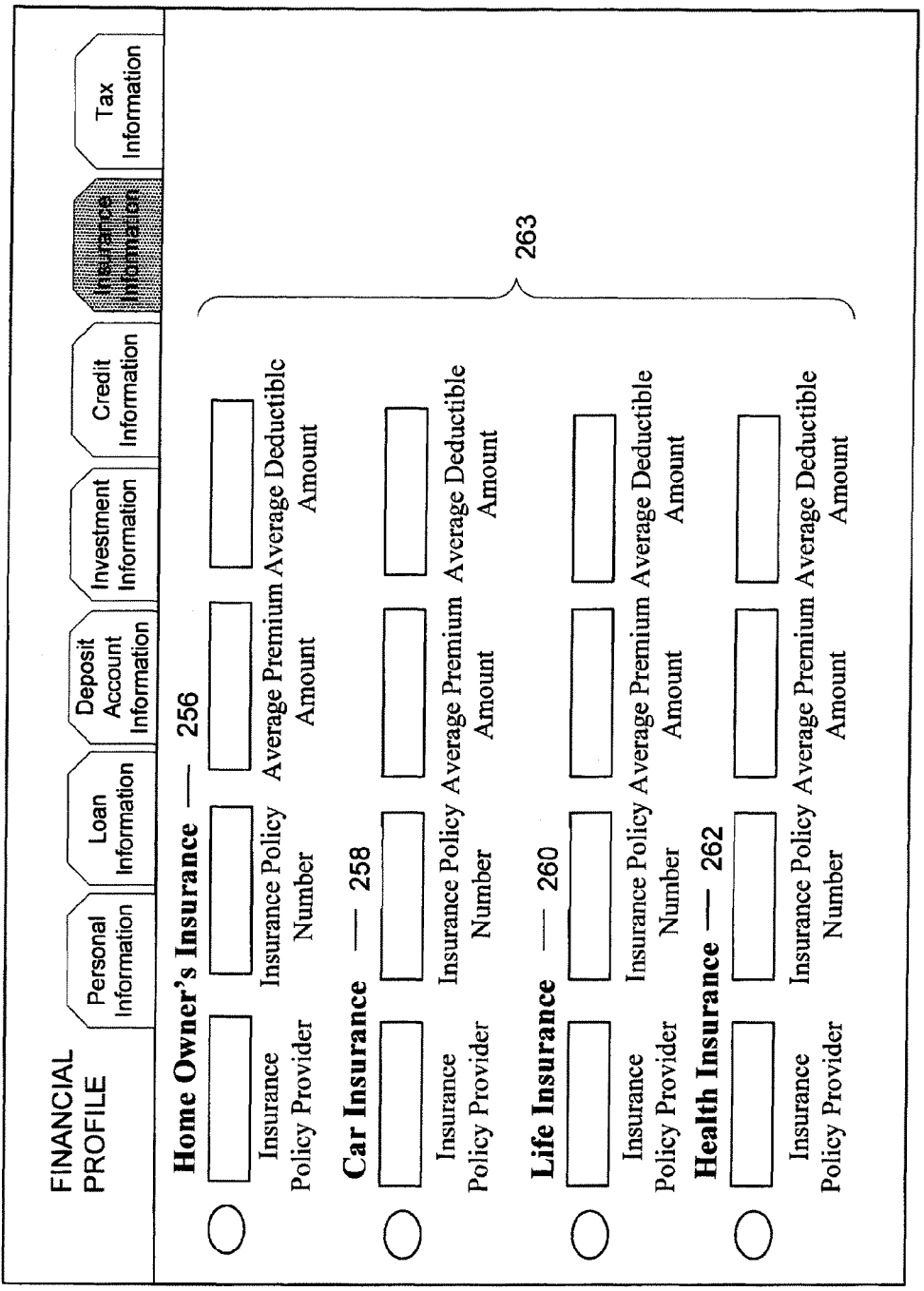
FIG. 2f depicts an exemplary embodiment of a customer-based interface displaying a screen display of an insurance information portion of a financial profile according to at least one embodiment of the disclosure.

Referring now to FIG. 2f, an exemplary depiction of a customer-based interface displaying a screen display of data fields 263 associated with the insurance information 254 of a financial profile according to at least one embodiment of the disclosure is depicted. As shown, the customer may input their insurance information into data fields 263 associated with the insurance information portion 212 depicted in FIG. 2a. Insurance information may include home owner's insurance information 256, car insurance information 258, life insurance information 260, health insurance information 262, and/or any other like information about one or more insurance policies that may be associated with the customer.

For example, the customer may fill in one or more data fields 263 associated with insurance policy provider, insurance policy number, average premium amount, and/or average deductible amount for each insurance type.

Figure 2G:
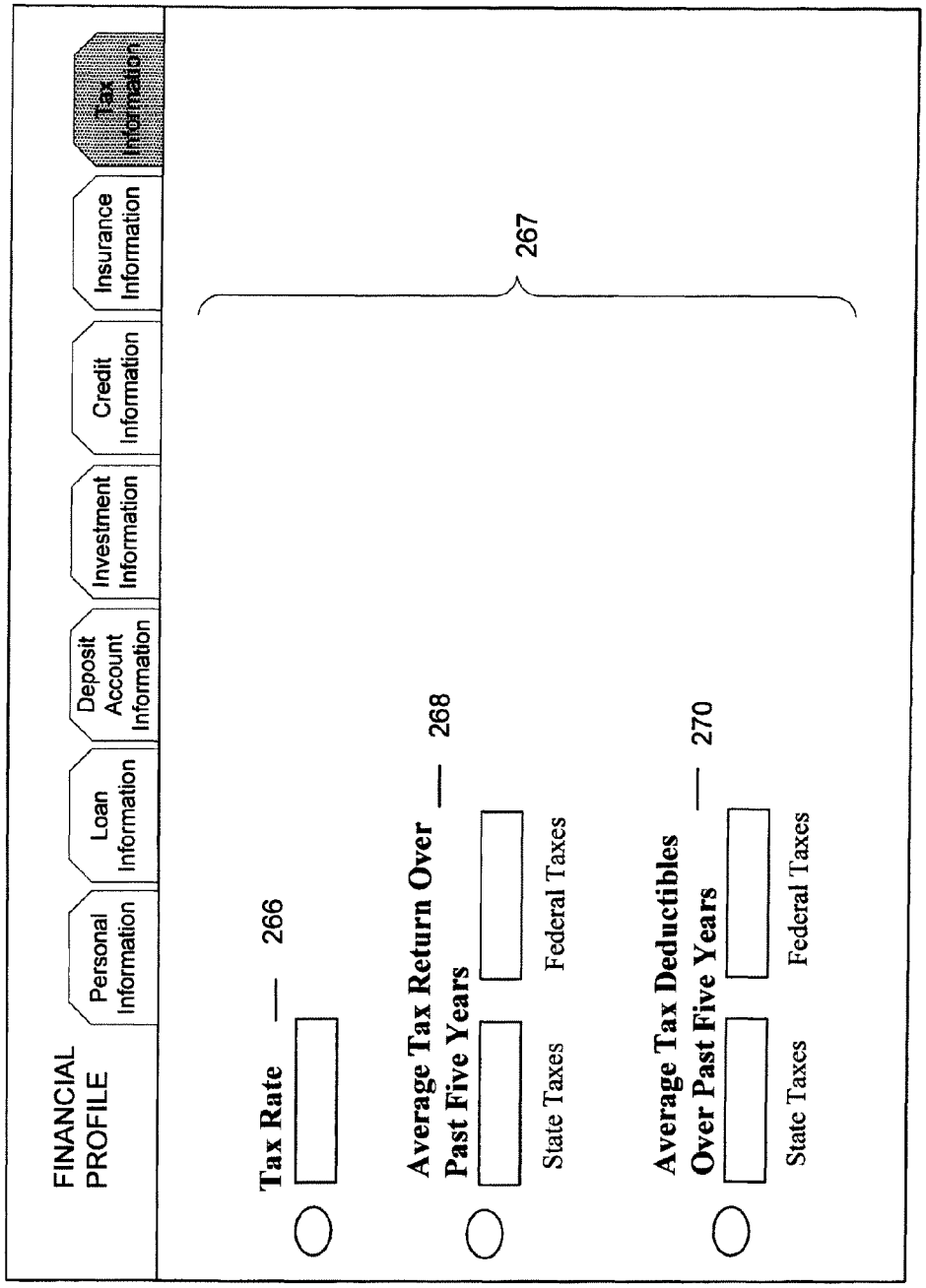
FIG. 2g depicts an exemplary embodiment of a customer-based interface displaying a screen display of a tax information portion of a financial profile according to at least one embodiment of the disclosure.

Referring now to FIG. 2g, an exemplary depiction of a customer-based interface displaying a screen display of data fields 267 associated with the tax information 264 of a financial profile according to at least one embodiment of the disclosure is depicted. As shown, the customer may input their tax information into data fields 267 associated with the tax information portion 214 depicted in FIG. 2a. Tax information may include the customer's rate at which their income may be taxed 266, average tax return over past five years tax information 268, average tax deductible over past five years tax information 270, and/or any other like tax information that may be associated with the customer.

For example, the customer may fill in one or more data fields 267 associated with state and federal tax return and/or state and federal tax deductible.

Figure 3A:
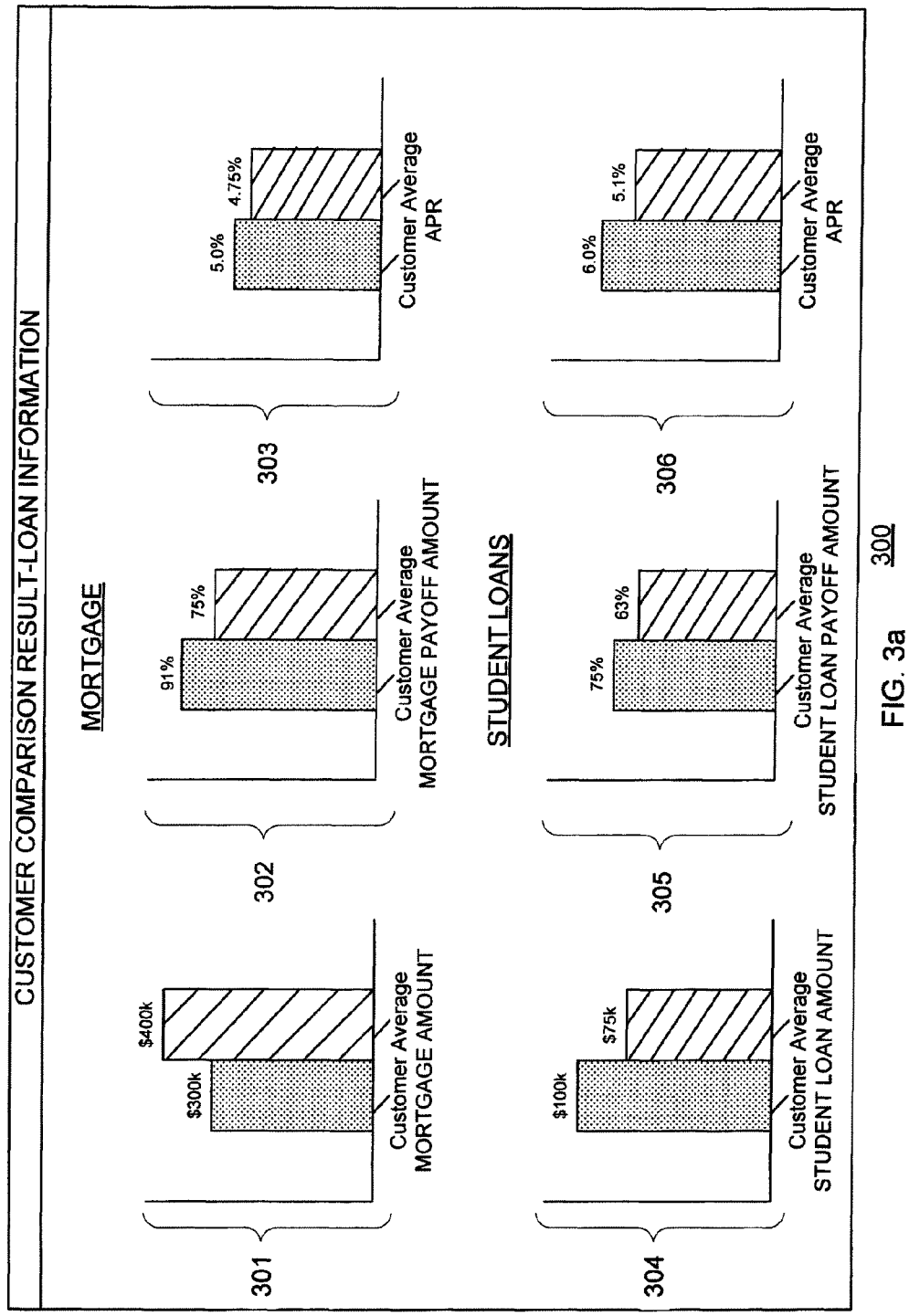
FIG. 3a depicts an exemplary embodiment of a customer-based interface displaying a screen display of a customer comparison result based on a loan information portion of a financial profile according to at least one embodiment of the disclosure.

Referring now to FIG. 3a, an exemplary depiction of a customer-based interface displaying a screen display 300 of the customer comparison result based on the loan information portion of a financial profile according to at least one embodiment is disclosed. As shown, a customer comparison module (e.g., customer comparison module 185) may output to the customer the result of comparing relevant portions of the customer's financial profile to the average of substantially similar portions of financial profiles and/or information accessible by the financial health meter system associated with individuals within the customer's peer group. In various embodiments, the customer comparison module may output the median of substantially similar portions of financial profiles and/or information accessible by the financial health meter system associated with individuals within the customer's peer group. Based on the comparison results, the customer may add and/or modify the financial goals portion of the customer's financial profile.

As shown, for example, the comparison result of the loan information 301 may indicate that the customer may have spent 100,000 less on their home than the customer's average peer. The comparison result of the loan information 302 may indicate, however, that the customer has 91% of the original cost of the home (i.e., $300,000) in order to pay off the mortgage, while the customer's average peer may only have paid off 75% of the original cost of their home. Additionally, the comparison result of the loan information 303 may indicate that the customer may have a 5.0% APR on their mortgage, while their average peer may have a 4.75% APR on their mortgage.

As shown, the comparison result of the loan information 304 may indicate that the customer may have 25,000 more in student loans than the customer's average peer. Comparison result of the loan information 305 may indicate that the customer has 75% of the original total of student loans (i.e., $100,000) in order to pay off the student loans, while the customer's average peer may have 63% of the original total of student loans to pay off. Additionally, the comparison result of the loan information 306 may indicate that the customer may have a 6.0% APR on their student loan, while their average peer may have a 5.1% APR on their student loan.

The customer comparison module may also output additional loan information comparison such as, for example, loan information associated with a student loan, car loan, and the like.

Figure 3B:
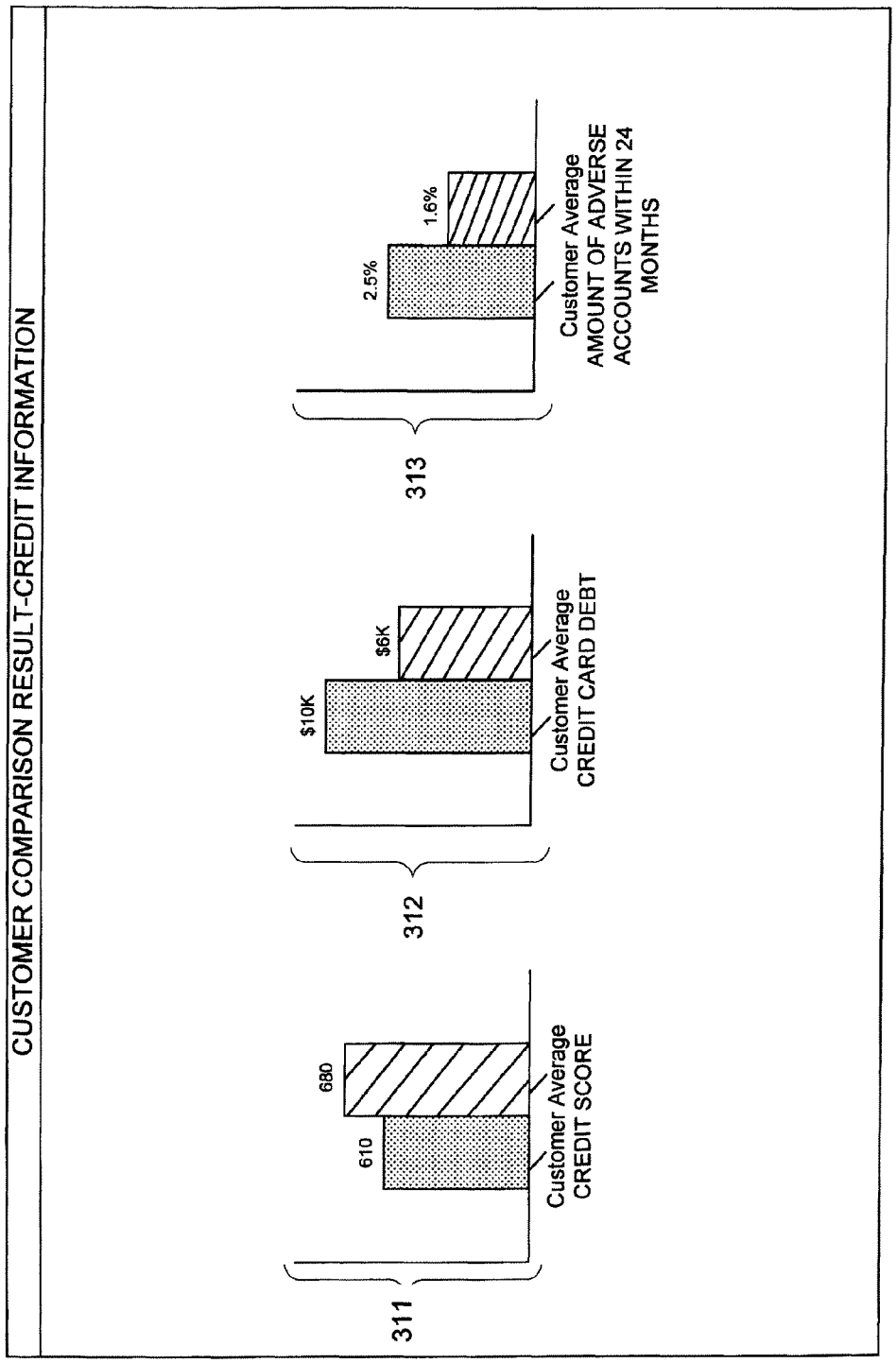
FIG. 3b depicts an exemplary embodiment of a customer-based interface displaying a screen display of a customer comparison result based on a credit information portion of a financial profile according to at least one embodiment of the disclosure.

Referring now to FIG. 3b, an exemplary depiction of a customer-based interface displaying a screen display 310 of the customer comparison result based on the credit information portion of a financial profile according to at least one embodiment is disclosed. As shown, a customer comparison module (e.g., customer comparison module 185) may output to the customer the result of comparing relevant portions of the customer's financial profile to the average of substantially similar portions of financial profiles and/or information accessible by the financial health meter system associated with individuals within the customer's peer group.

As shown, for example, the comparison result of the credit information 311 may indicate that the customer may have a credit score 70 points less than the customer's average peer. Additionally, the comparison result of credit card debt information 312 may indicate that the customer may have $10,000 in credit account debt while the customer's average peer may have $6,000 in credit account debt. The comparison result of adverse account information 313 may indicate that 2.5% of the customer's credit accounts may be delinquent, while the customer's average peer may have 1.6% of their credit accounts in delinquency.

Figure 4A:
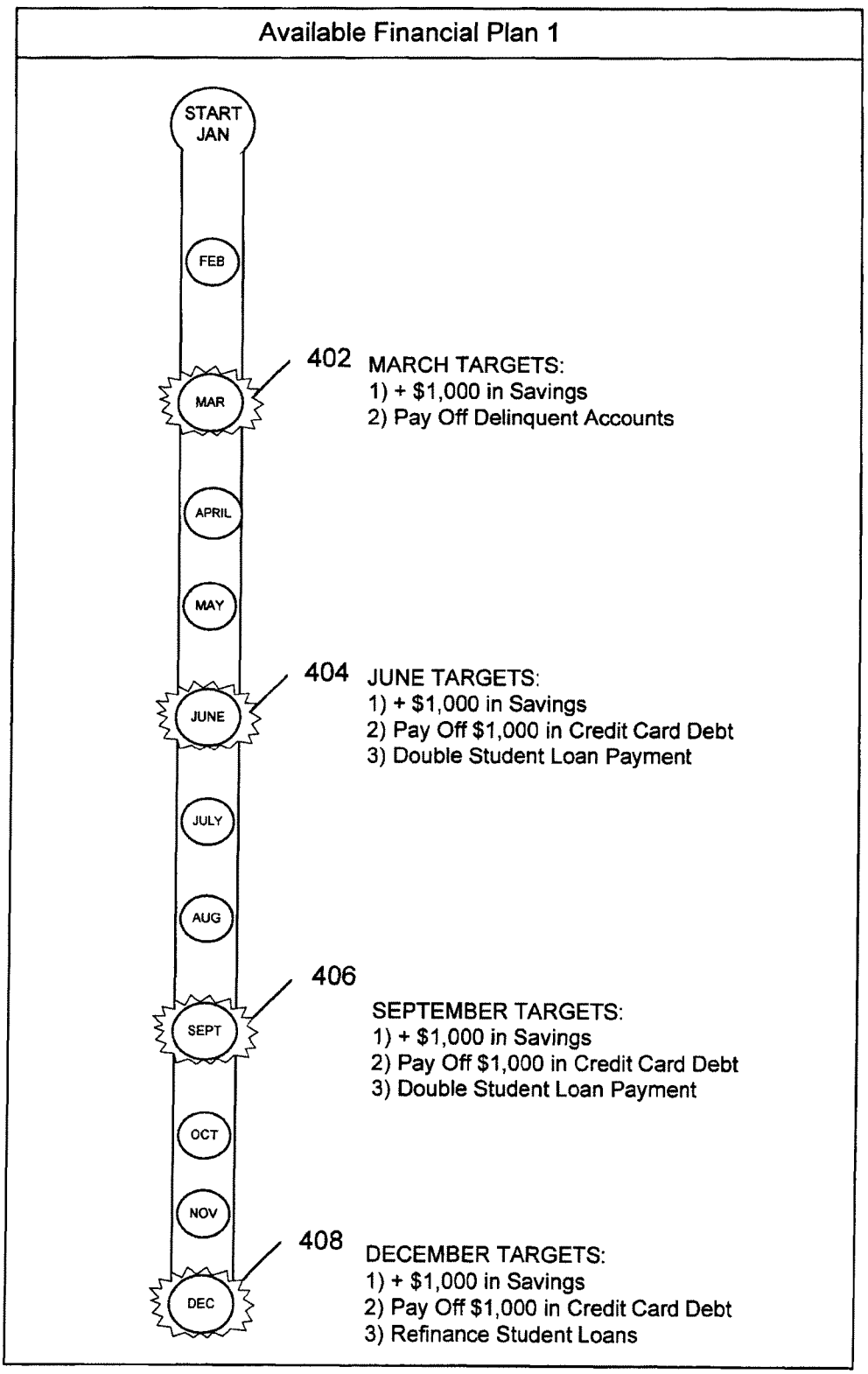
FIG. 4a depicts an exemplary embodiment of a customer-based interface displaying a screen display of an available financial plan based on a financial profile according to at least one embodiment of the disclosure.
Figure 4B:
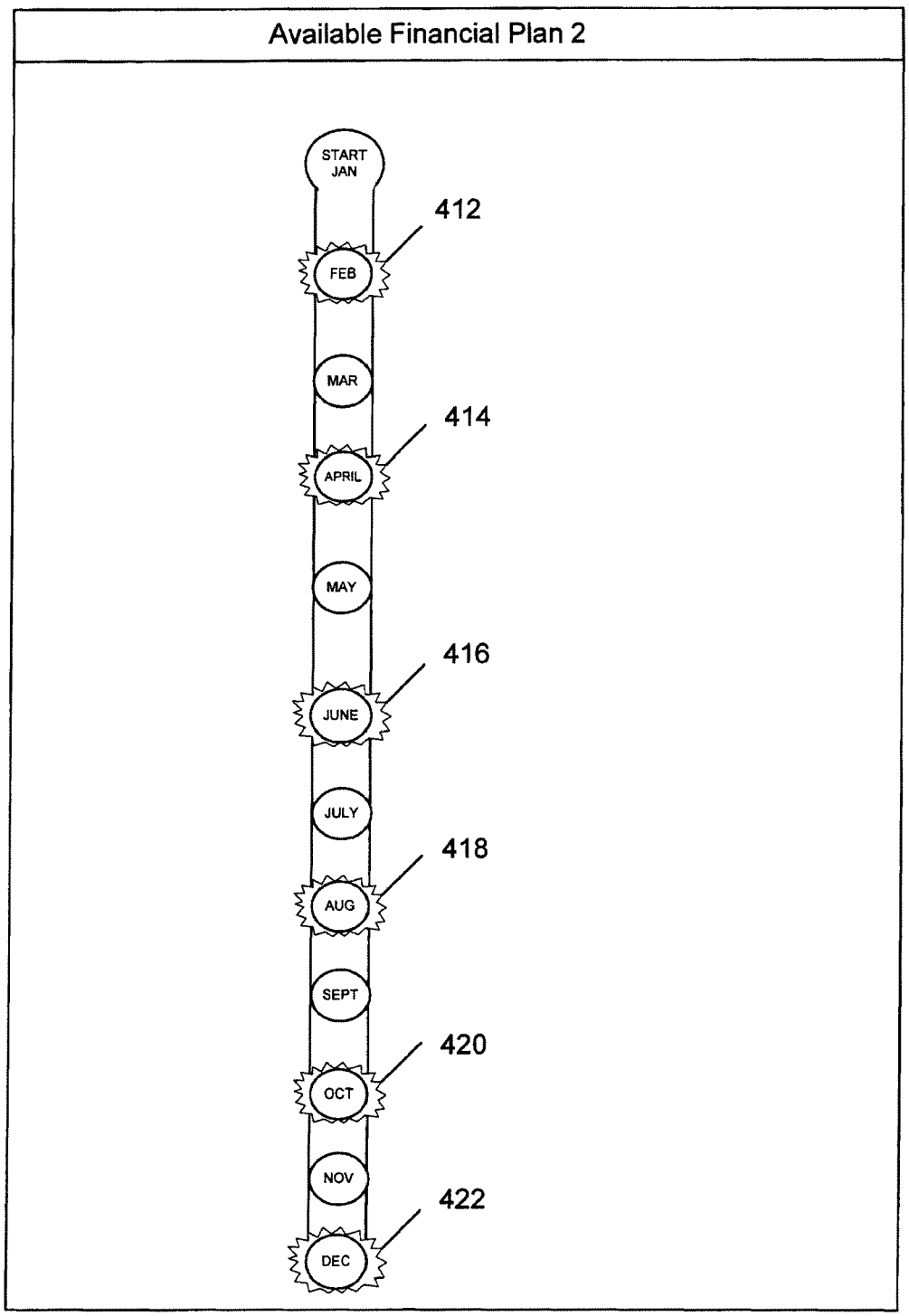
FIG. 4b depicts an exemplary embodiment of a customer-based interface displaying a screen display of an available financial plan based on a financial profile according to at least one embodiment of the disclosure.

FIG. 4a illustrates an exemplary depiction of a customer-based interface displaying a screen display 400 of an available financial plan based on a financial profile according to at least one embodiment of the disclosure. FIG. 4b illustrates an exemplary depiction of a customer-based interface displaying a screen display 410 of an additional available financial plan based on a financial profile according to at least one embodiment of the disclosure. FIG. 4c illustrates an exemplary depiction of a customer-based interface displaying a screen display 424 of an additional available financial plan based on a financial profile according to at least one embodiment of the disclosure. As previously discussed, a processor module (e.g., processor module 170) may create one or more available financial plans for the customer in varying degrees of risk tolerance. Risk tolerance may include the amount of financial resources a customer may be able to contribute to maintain the implemented financial plan. The customer may select a financial plan that most closely indicates the amount of risk tolerance the customer may be able to maintain.

Varying degrees of risk tolerance may include such factors as speed in meeting intermediate financial goals, amount of target checkpoints, frequency of target checkpoints, and/or total time period for the financial plan. As shown in FIG. 4a, a processor module may output available financial plan 1 400 of the one or more available financial plans outputted to the customer. Given that there may be quarterly target checkpoints, at March 402, at June 404, at September 406, and at December 408, with moderately paced intermediate financial goals over a 12 month period, available financial plan 1 400 may be determined to be moderate on the scale from most risky to least risky.

As shown in FIG. 4b, a processor module may output available financial plan 2 410 of the one or more available financial plans outputted to the customer. Given that there may be bi-monthly target checkpoints, at February 412, at April 414, at June 416, at August 418, at October 420, and at December 422, with moderately paced intermediate financial goals over a 12 month period, available financial plan 2 410 may be determined to be more risky than available financial plan 1 on the scale from least risky to most risky.

As shown in FIG. 4c, a processor module may output available financial plan 3 424 of the one or more available financial plans outputted to the customer. Given that there may be semiannual target checkpoints, at June 426 and at December 428, with moderately paced intermediate financial goals, available financial plan 3 424 may be determined to be the least risky of the three available financial plans, 400, 410, and 424.

In various embodiments, a processor module may increase the risk of the one or more available financial plans by shortening the overall period of the one or more available financial plans, increasing the pace of the intermediate financial goals, and/or increasing the frequency of target checkpoints. In various embodiments, a processor module may decrease the risk of the one or more available financial plans by increasing the overall period of the one or more available financial plans, decreasing the pace of the intermediate financial goals, and/or decreasing the frequency of target checkpoints. Based on these one or more available financial plans, the customer may weigh the amount of risk they may be able to handle and select an available financial plan that best fits the customer's risk tolerance.

Figure 5:
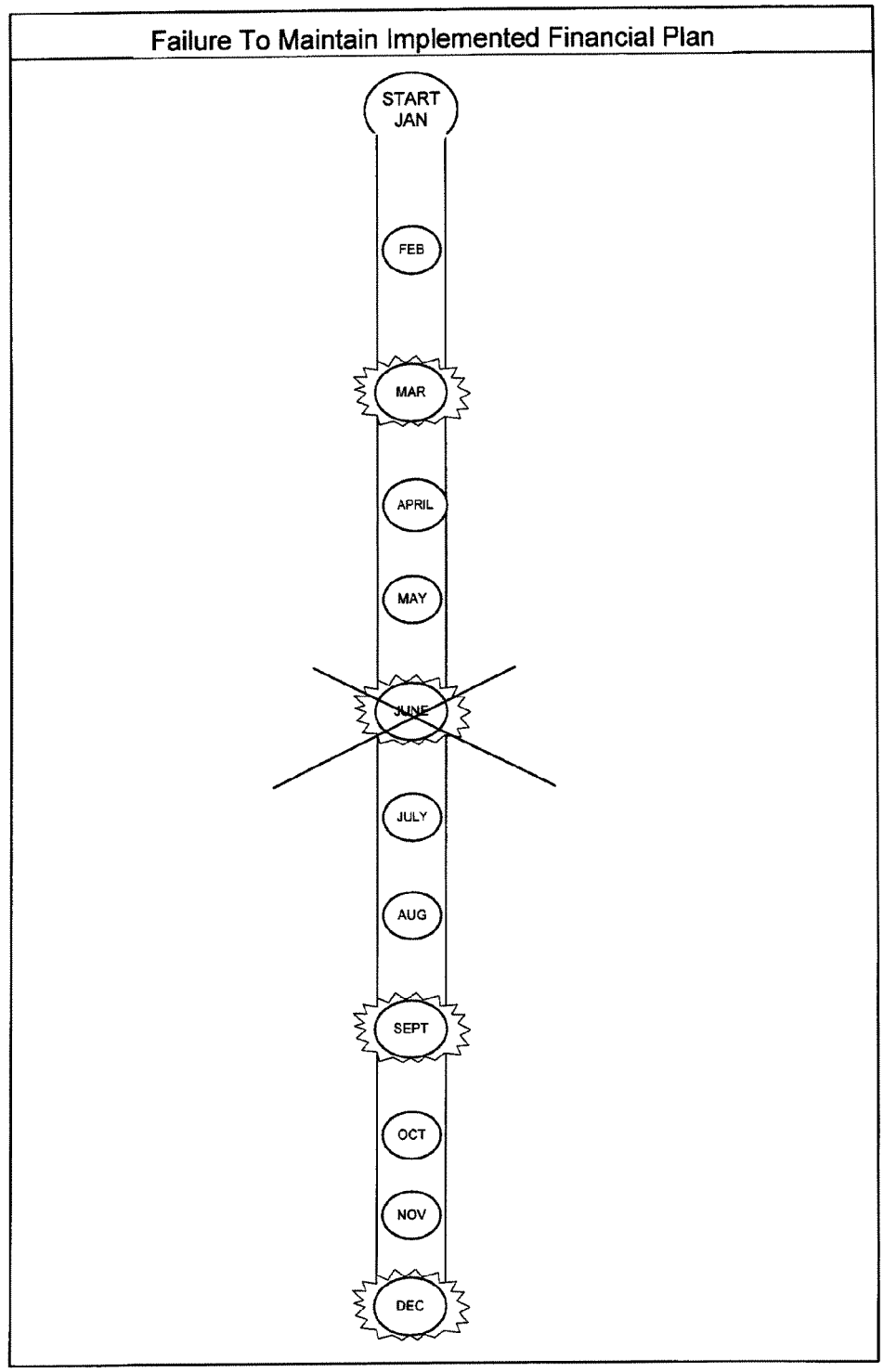
FIG. 5 depicts an exemplary embodiment of a customer-based interface displaying a screen display of an implementation of a financial plan and a customer's failure to meet a target checkpoint according to at least one embodiment of the disclosure.

Referring now to FIG. 5, an exemplary embodiment of a customer-based interface 500 displaying a screen display of an implementation of a financial plan and a customer's failure to meet a target checkpoint according to at least one embodiment of the disclosure is depicted. As previously discussed, a financial planning module (e.g., financial planning module 180) may implement and monitor the financial plan. A financial planning module may monitor each target checkpoint by comparing the intermediate goals associated with that target checkpoint to the present state of the customer's financial profile.

In various embodiments, the customer may be requested by the financial health meter system to update the financial profile information associated with the customer's financial profile. For example, the financial health meter system may send the request in an Email message to an Email inbox associated with the customer system using a network. The financial health meter system may send a hard copy of the request in the mail to the customer. The financial health meter system may also notify the customer of the request through a customer representative using a telephone line.

If, for example, in the June target checkpoint, the financial planning module determines that the customer's financial profile is not substantially equivalent to the intermediate financial goals set by financial health meter system, financial planning module may transmit the portion of the financial plan that the customer did not meet to a processor module to re-process and re-create more available financial plans for the customer. If, however, the financial planning module determines that the customer's financial profile is substantially equivalent to the intermediate financial goals set by financial health meter system, financial planning module may continue to monitor the financial plan.

Figure 6B:
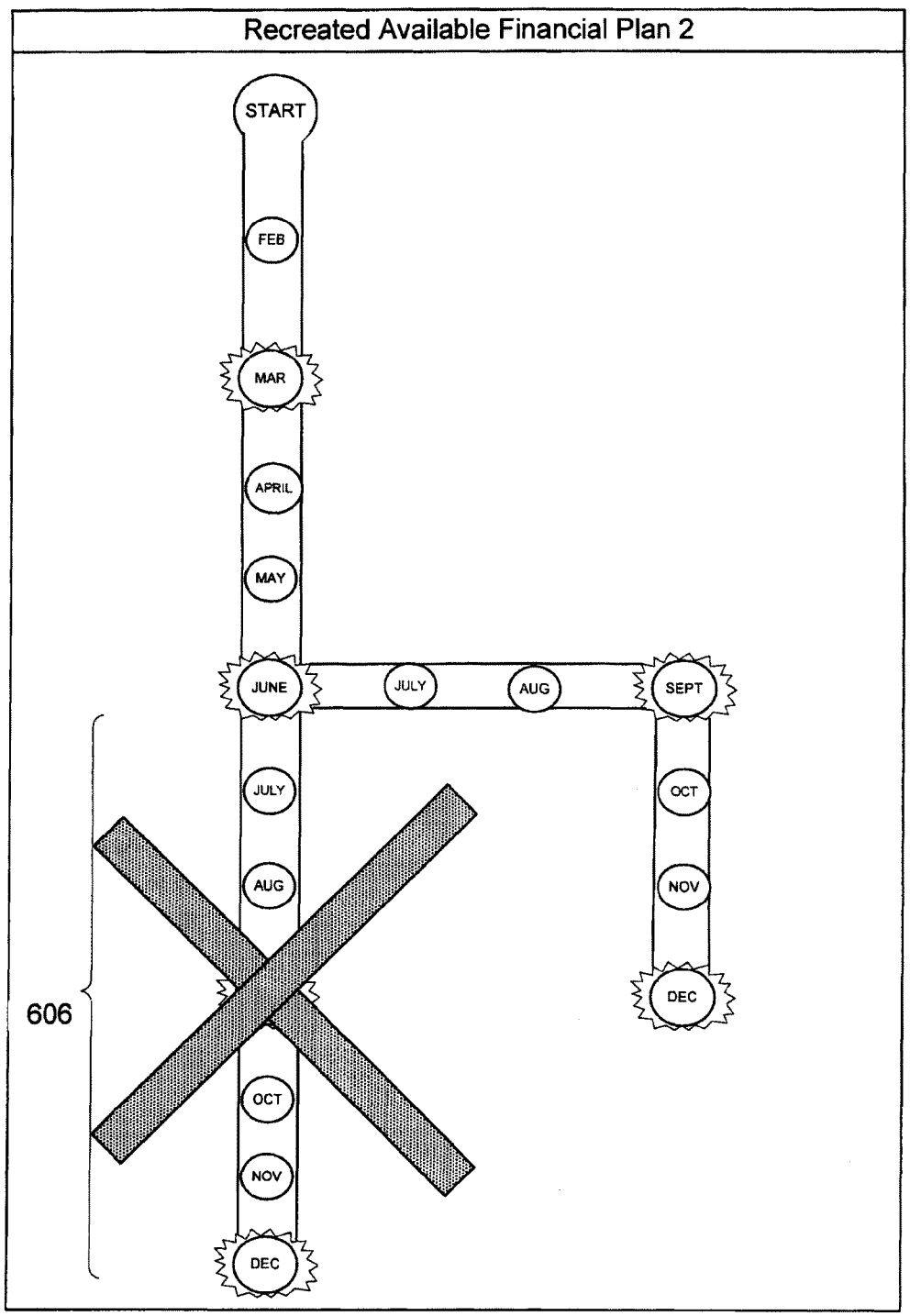
FIG. 6b depicts an exemplary embodiment of a customer-based interface displaying a screen display of a recreated available financial plan based on a financial profile according to at least one embodiment of the disclosure.

FIG. 6a illustrates an exemplary depiction of a customer-based interface displaying a screen display 600 of a recreated available financial plan based on a financial profile according to at least one embodiment of the disclosure. FIG. 6b illustrates an exemplary depiction of a customer-based interface displaying a screen display 604 of an additional recreated available financial plan based on a financial profile according to at least one embodiment of the disclosure. As previously discussed, a processor module (e.g., processor module 170) may re-create one or more available financial plans for the customer in varying degrees of risk tolerance to place the customer back on track of a financial plan.

As shown in FIG. 6a, a processor module may output recreated available financial plan 1 600 of the one or more recreated available financial plans outputted to the customer. Given that there may be quarterly target checkpoints with moderately paced intermediate financial goals over a 15 month period to add another quarter to meet the intermediate financial goals, recreated available financial plan 1 600 may be determined to be moderate on the scale from least risky to most risky. Portion 602 may indicate the portion of the financial plan that may be discarded as a result of the customer's failure to maintain the original implemented financial plan.

As shown in FIG. 6b, a processor module may output recreated available financial plan 2 604 of the one or more recreated available financial plans outputted to the customer. Given that there may be quarterly target checkpoints with moderately paced intermediate financial goals with the 12 month period remaining in place, recreated available financial plan 2 606 may be determined to be more risky than recreated available financial plan 1 on the scale from least risky to most risky. Portion 606 may indicate the portion of the financial plan that may be discarded as a result of the customer's failure to maintain the original implemented financial plan.

As shown in FIGS. 6a and 6b, once the customer selects the new financial plan, the financial planning module may implement and monitor the financial plan beginning at the point the previous financial plan left off.

Figure 7:
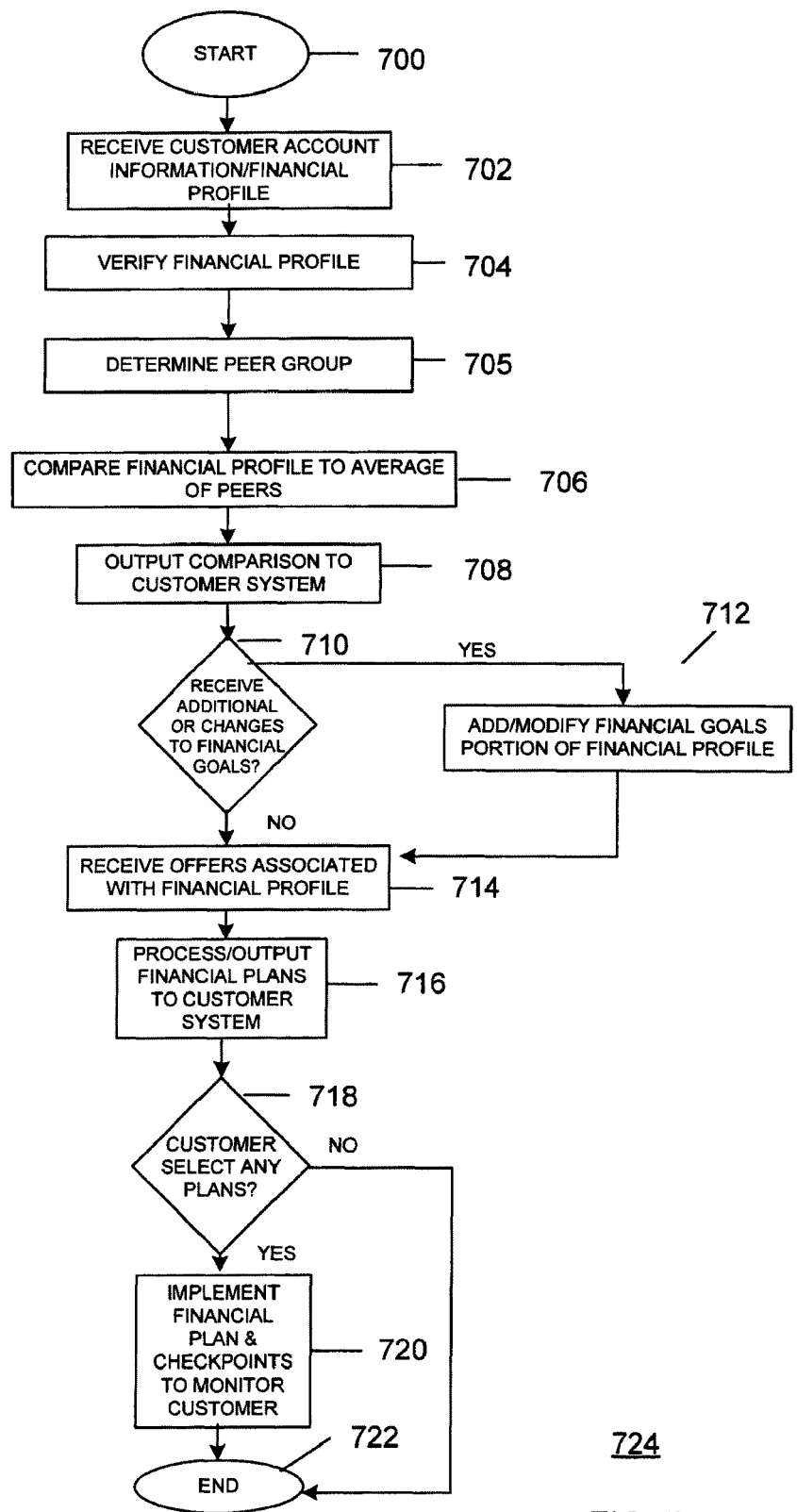
FIG. 7 depicts a flow chart detailing interactions between a financial health meter system and a customer according to at least one embodiment of the disclosure.

Referring now to FIG. 7, a flow chart 724 detailing interactions between a financial health meter system and a customer according to at least one embodiment of the disclosure is depicted. In block 700, the method may be initiated. In block 702, customer account information and/or a customer's financial profile may be received. In an exemplary embodiment, the customer account information and/or the customer's financial profile may be received by a financial health meter system. Receiving the customer's account information may include the customer creating a customer account.

A customer may create a customer account using a customer system associated with an interface such as a web browser, to input information associated with the customer such as the customer's name, the customer's telephone number, the customer's address, the customer's cellular telephone number, and the customer's e-mail address into the financial health meter system. A customer system may transmit information associated with a customer to a financial health meter system using a network. Upon receiving information associated with a customer, a financial health meter system may assign a unique customer account number to that particular customer and store information associated with a customer account.

If, for example, a customer is a returning user, the customer may transmit a unique customer account number to a financial health meter system using a customer system.

Also in block 702, a financial health meter system may receive a financial profile from a customer via a network. A financial health meter system may store a financial profile in a customer interface module. A financial health meter system may also store a financial profile in a database using a database module.

In block 704, a financial health meter system may verify information associated with a financial profile. Verifying a financial profile may include verifying the accuracy of financial profile information associated with a financial profile. Verifying may also include accessing a customer's credit report. A customer interface module (e.g., customer interface module 185) may also access information associated with a customer's financial accounts using financial profile information associated with a financial profile to access a customer's financial accounts.

For example, verifying information associated with a financial profile may include accessing information associated with a customer from past interactions with the customer.

A customer may have established a financial account using a financial health meter system and/or another system associated with the financial health meter system. Accordingly, verifying may include comparing information associated with a particular customer from past interactions to information provided by a customer in a financial profile for accuracy.

In various embodiments, a customer interface module may determine that amounts within $100 or less may be considered verified. A customer interface module may determine the greatest amount by which two compared accounts may differ to consider them verified. A customer interface module may also verify accounts with equal amounts.

In block 705 a customer comparison module may determine a peer group of financial profiles for a customer. In various embodiments, a customer's peer group may include individuals within any number of years of a customer's age (e.g., ±4 years). A customer comparison module may determine a range of individuals' age that fall within a customer's peer group by subtracting a number of years and adding the number of years to a customer's age. If, for example, a customer is 35 years old, a customer comparison module may determine a range of individuals within a customer's peer group to be from age 31 to age 39, by subtracting 4 and adding 4 to the customer's age of 35, respectively.

A customer's peer group may also include similarly situated individuals relative to one or more age groups, income, debt, debt-to-income ratios, demographic profile, location, gender, and/or any other peer-related benchmarks. In various embodiments, a customer may select which peer-related benchmark may be used in determining a peer group for a customer. A financial health meter system may randomly select which peer-related benchmark may be used in determining a peer group for a customer. Additionally, the implementers of a financial health meter may select which peer-related benchmark may be used in determining a peer group for a customer.

In block 706 a customer comparison module may compare one or more data fields associated with portions of a customer's financial profile to one or more data fields associated with substantially similar portions of financial profiles and/or information accessible by a financial health meter system associated with individuals within a customer's peer group.

Comparing a customer's financial condition may include a customer comparison module scanning each portion of each financial profile and/or information accessible by the financial health meter system associated with individuals within a customer's peer group to group substantially similar portions of the customer's financial profile with substantially similar portions of the financial profiles and/or information accessible by the financial health meter system associated with individuals within the customer's peer group.

Comparing a customer's financial condition may also include a customer comparison module calculating an average and/or median value of similar stored values associated with individuals within a customer's peer group. Calculating the average value of the similar stored values may include adding all similar stored values and dividing by the number of stored values.

In various embodiments, a customer comparison module may also calculate a threshold value for each data field type that may be associated with an average value. A threshold value may include a standard deviation value associated with a group of similar stored values. For example, a customer comparison module may calculate the standard deviation of the similar stored values of 674, 669, 687, 676, and 702 to be 13.16. A threshold value may be calculated using methods known to those of ordinary skill in the art to calculate the standard deviation.

In block 708 the customer comparison module may transmit comparison information to a customer interface module to enable transmission and subsequent display of the one or more of the average and/or median values to the customer. Comparison information may include a value for one or more data field types associated with a customer's financial profile. Comparison information may also include one or more values associated with a customer's financial profile grouped with an average and/or median value for each substantially similar data field type of each financial profile and/or or information accessible by the financial health meter system associated with individuals within the customer's peer group. The values may be transmitted to a customer comparison module using a network.

In block 710 a financial health meter system may wait for a customer to submit additions and/or changes to a financial goals portion of a customer's financial profile based on the result of the comparison. Waiting for a customer may include a financial health meter system initiating a count down clock. If, for example, a financial health meter system initiates a count down clock of 24 hours, if a customer does not submit any additions and/or changes, a financial health meter system may proceed to block 714. If, however, within the count down time period, the customer submits additions and/or changes to a financial profile, a financial health meter system may add and/or change the customer's financial profile according to the submitted additions and/or changes in block 712.

In block 714, a financial health meter system may receive one or more offers from a participating financial institution and/or financial institution associated with the financial health meter system based on a portion of a financial profile that may be accessible to the participating financial institution and/or financial institution associated with the financial health meter system. Offers may include information such as, for example, the type of financial service and/or product being offered, a minimum balance, an APR, an APY, an expiration date, and/or any other like information that may be associated with an offer. Offers may be received via a network using a network module. A financial health meter system may store and process offers made by the participating financial institution in a processor module.

In block 716, based on varying degrees of risk tolerance, a processor module may create one or more available financial plans to output to a customer. Varying degrees of risk tolerance may include such factors as speed in meeting intermediate financial goals, frequency of target checkpoints, and/or total time period for a financial plan. A processor module may output one or more available financial plans.

Creating one or more available financial plans may include a processor module accessing scores assigned to one or more data field types associated with a customer's financial profile in a customer comparison module using a network. A processor module may also access offers from one or more participating financial institutions and/or one or more financial institutions associated with the financial health meter system using a network. A processor module may also decipher each of the financial goals listed by a customer in a customer's financial profile.

Additionally, creating one or more available financial plans may include a processor module adding an additional point to increase the score of each data field type associated with a customer's financial profile that may be effected by one of the offers from the participating financial institutions and/or financial institutions associated with the financial health meter system. Whether a data field type associated with a customer's financial profile may be effected by one of the offers from the participating financial institutions and/or financial institutions associated with the financial health meter system may be established by the implementers of a financial health meter system.

Additionally, creating one or more available financial plans may include a processor module adding an additional point to increase the score of each data field type associated with a customer's financial profile that may be effected by one of the financial goals listed by the customer in the financial profile. Whether a data field type associated with the customer's financial profile may be effected by one of the financial goals listed by a customer in a financial profile may be established by the implementers of a financial health meter system.

A processor module may then arrange all of the data field types associated with a customer's financial profile in order from those associated with the lowest score to those associated with the highest score. A processor module may disregard one or more data field types associated with a score of zero. A processor module may also group the arranged data field types into two or more substantially equal groups from data field types associated with the lowest scores to data field types associated with highest scores.

Based on the pre-established determination of whether a customer may benefit the most by decreasing and/or increasing the value associated with one or more data field types, a processor module may establish one or more intermediate financial goals for each data field type. In various embodiments, intermediate financial goals associated with data field types that may be associated with high scores may be determined to be scheduled at the beginning of the financial plan. Intermediate financial goals associated with data field types that may be associated with low scores may be determined to be scheduled toward the middle and/or end of the financial plan.

Also in block 716, a processor module may output one or more available financial plans. A processor module may transmit one or more available financial plans to a customer interface module to enable transmission and subsequent display of one or more available financial plans to a customer.

If a customer does not select any of the one or more available financial plans created by a processor module in block 718, the process may end in block 722. If, however, a customer selects one of the one or more available financial plans created by a processor module in block 718, the process may continue to block 720.

In block 720, a financial planning module may implement and monitor a financial plan selected by a customer. Implementing a financial plan may include initiating the creation of one or more documents to assist in electronically transferring information to the participating financial institution and/or financial institution associated with the financial health meter system whose offer may have been implemented in the financial plan. For example, such a document (e.g., credit card application, loan application, checking account application, 401K application, IRA application, and/or other like documents) may include information such as financial account information such as an account number, routing number associated with a particular bank, account balance, loan balance, and other like information.

In these embodiments, documents may contain pre-filled fields that include information already provided by a customer in a customer's financial profile and/or provided by a financial health meter system. Accordingly, information to be transferred may include financial account information such as an account number, routing number associated with a particular bank, account balance, loan balance, and other like information. In various embodiments, electronically transferring information may include a financial institution transmitting a customer's financial account information via a network.

Monitoring a financial plan may include scanning each target checkpoint at the associated due date and comparing the values associated with the intermediate financial goals to the values presently associated with a customer's financial profile. If, for example, a financial planning module determines that a customer's financial profile is not substantially equivalent to the intermediate financial goals set by a financial health meter system, a financial planning module may transmit the portion of the financial plan that the customer did not meet to a processor module to reprocess and recreate more available financial plans for a customer. If, however, a financial planning module determines that a customer's financial profile is substantially equivalent to the intermediate financial goals set by a financial health meter system, a financial planning module may continue to monitor a financial plan.

A financial planning module may transmit a graphical representation of a customer's progress on a financial plan to a customer interface module to enable transmission and subsequent display of a customer's progress to a customer. The method may end in block 722.

Figure 8:
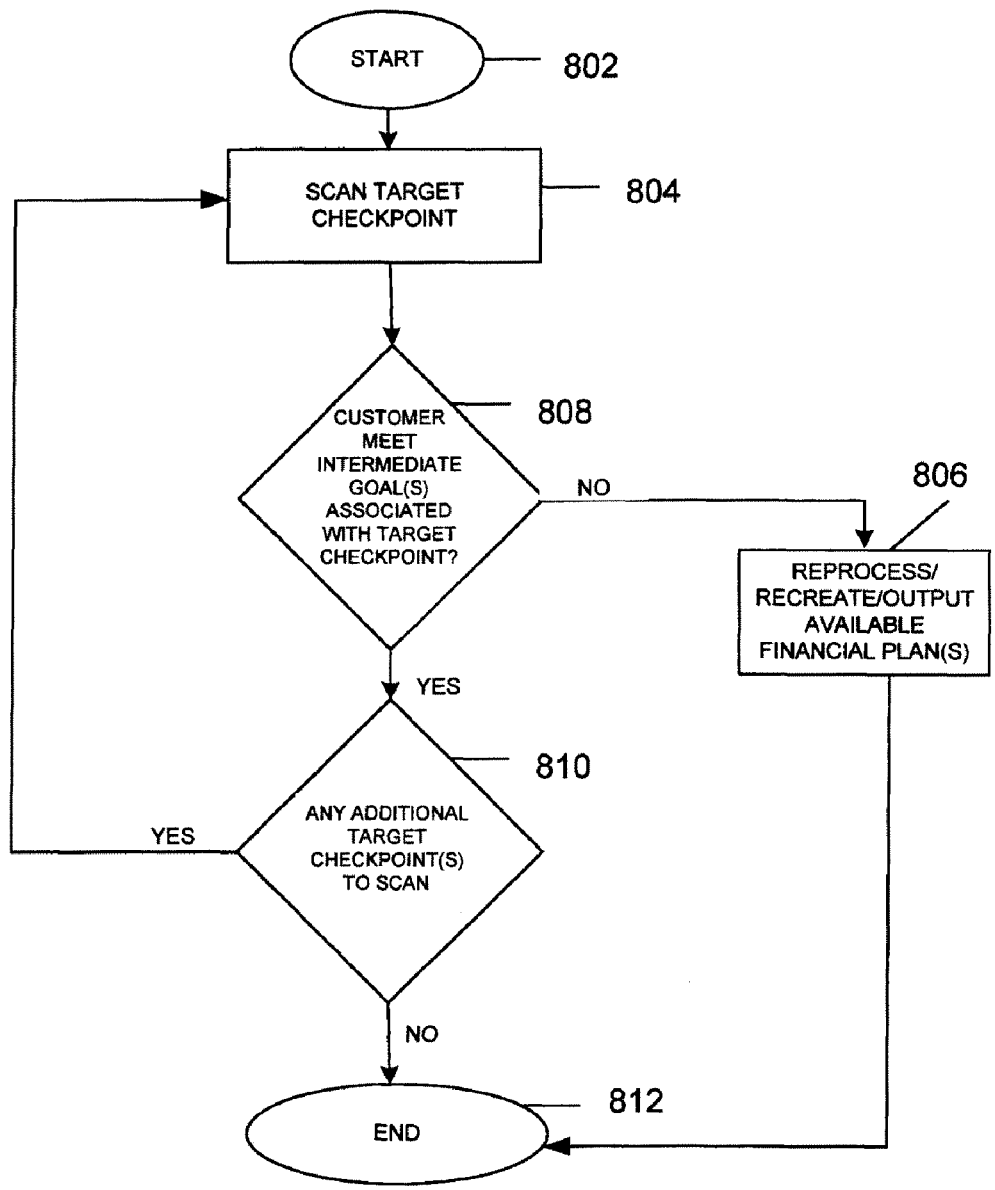
FIG. 8 depicts a flow chart detailing a financial health meter system monitoring a customer's progress in a financial plan.

Referring now to FIG. 8, a flow chart 800 detailing a financial health meter system monitoring a customer's progress in a financial plan according to at least one embodiment of the disclosure is depicted. In block 802, the method may be initiated. In block 804, a financial planning module may begin monitoring a customer's progress in an implemented financial plan by scanning a target checkpoint.

Scanning may include scanning each target checkpoint at the associated due date and comparing the values associated with the intermediate financial goals to the values presently associated with the customer's financial profile. In various embodiments, a customer may be requested by a financial health meter system to update financial profile information associated with a customer's financial profile. For example, a financial health meter system may send the request in an Email message to an Email inbox associated with the customer system using a network. A financial health meter system may send a hard copy of the request in the mail to a customer. A financial health meter system may also notify a customer of the request through a customer representative using a telephone line. A financial health meter system may verify requested information inputted into the financial health meter system by a customer.

In block 808, a financial planning module may determine if a customer has met the intermediate goals associated with a target checkpoint. If a financial planning module determines that a customer's financial profile is not substantially equivalent to the intermediate financial goals set by financial health meter system, a financial planning module may transmit the portion of a financial plan that a customer did not meet to a processor module to re-process, re-create, and output one or more available financial plans for a customer in block 806.

If, however, a financial planning module determines that a customer's financial profile is substantially equivalent to the intermediate financial goals set by a financial health meter system, a financial planning module may continue to the method in block 810. In block 810, a financial planning module may determine if there are any additional target checkpoints to be scanned in a financial plan. If a financial planning module determines that there is at least one target checkpoint to be scanned, the method may proceed to block 804 restart the monitoring process. If, however, a financial planning module determines that there is not any more target checkpoints to be scanned in a financial plan, the method may end at block 812.

The embodiments of the present inventions are not to be limited in scope by the specific embodiments described herein. Thus, modifications are intended to fall within the scope of the following appended claims. Further, although some of the embodiments of the present invention have been described herein in the context of a particular implementation in a particular environment for a particular purpose, those of ordinary skill in the art should recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein. While the foregoing description includes many details and specificities, it is to be understood that these have been included for purposes of explanation only, and are not to be interpreted as limitations of the invention. Many modifications to the embodiments described above can be made without departing from the spirit and scope of the invention.

What is claimed is:

1. A computer-implemented method for analyzing and monitoring a customer's financial condition comprising:
    storing a financial profile associated with a customer, the financial profile comprising at least financial information about the customer and one or more financial goals of the customer, the financial information relating to one or more financial accounts of the customer;
    determining a peer group of financial profiles for the customer;
    comparing the financial profile associated with the customer to the peer group of financial profiles to generate comparison information;
    using one or more computer processors, developing one or more financial plans based on the financial profile and the comparison information, wherein each of the one or more financial plans comprises a plurality of potential courses of action to be taken by the customer with respect to at least one of the one or more financial accounts over a period of time to assist the customer in achieving the one or more financial goals, wherein each of the plurality of potential courses of action are based at least in part on the financial profile and the comparison information;
    implementing one of the one or more financial plans; and
    monitoring the implemented financial plan.

2. The method of claim 1, wherein a peer group of financial profiles is defined based on the customer's age, income, debt, debt-to-income ratio, demographic profile, location, or gender.

3. The method of claim 1, wherein comparing the financial profile associated with the customer to the peer group of financial profiles further comprises comparing portions of the financial profile associated with the customer to substantially similar respective portions of the peer group of financial profiles.

4. The method of claim 3, wherein comparing further comprises calculating a threshold value.

5. The method of claim 4, wherein the threshold value comprises at least a standard deviation of an average amount.

6. The method of claim 4, wherein comparing further comprises assigning a score to a data field type based on at least the threshold value associated with the data field type.

7. The method of claim 1, wherein developing one or more financial plans further comprises determining a set of one or more intermediate goals.

8. The method of claim 7, wherein the set of one or more intermediate goals are associated with the one or more financial goals of the customer.

9. The method of claim 1, wherein implementing one of the one or more financial plans comprises creating one or more documents associated with the one of the one or more financial plans.

10. The method of claim 1, wherein monitoring the implemented financial plan further comprises monitoring one or more target checkpoints.

11. The method of claim 1, wherein monitoring the implemented financial plan further comprises recreating the one or more financial plans.

12. A financial health meter system for analyzing and monitoring a customer's financial condition comprising:
    a customer interface processor that stores a financial profile associated with a customer, the financial profile comprising at least financial information about the customer and one or more financial goals of the customer, the financial information relating to one or more financial accounts of the customer;
    a customer comparison processor that determines a peer group of financial profiles for the customer and compares the financial profile associated with the customer to the peer group of financial profiles to generate comparison information;
    a processor that develops one or more financial plans based on the financial profile and the comparison information, wherein each of the one or more financial plans comprises a plurality of potential courses of action to be taken by the customer with respect to at least one of the one or more financial accounts over a period of time to assist the customer in achieving the one or more financial goals, wherein each of the plurality of potential courses of action are based at least in part on the financial profile and the comparison information; and
    a financial planning processor that implements one of the one or more financial plans and monitors the implemented financial plan.

13. The system of claim 12, wherein a peer group of financial profiles is defined based on the customer's age, income, debt, debt-to-income ratio, demographic profile, location, or gender.

14. The system of claim 12, wherein the comparison processor further compares portions of the financial profile associated with the customer to substantially similar respective portions of the peer group of financial profiles.

15. The system of claim 14, wherein the comparison processor further calculates a threshold value.

16. The system of claim 14, wherein the threshold value comprises at least a standard deviation of an average amount.

17. The system of claim 14, wherein the comparison processor further assigns a score to a data field type based on at least the threshold value associated with the data field type.

18. The system of claim 12, wherein the processor further determines a set of one or more intermediate goals.

19. The system of claim 12, wherein the financial planning processor further monitors one or more target checkpoints.

20. The system of claim 12, wherein the financial planning processor further recreates the one or more financial plans.

* * * * *

UNITED STATES PATENT AND TRADEMARK OFFICE
CERTIFICATE OF CORRECTION

| | | |
|---|---|---|
| PATENT NO. | : 8,341,057 B1 | Page 1 of 1 |
| APPLICATION NO. | : 11/767111 | |
| DATED | : December 25, 2012 | |
| INVENTOR(S) | : Wagner et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this
Twenty-sixth Day of August, 2014

Michelle K. Lee
*Deputy Director of the United States Patent and Trademark Office*